US008633874B2

(12) United States Patent
Matsui

(10) Patent No.: US 8,633,874 B2
(45) Date of Patent: Jan. 21, 2014

(54) DISPLAY DEVICE AND METHOD OF DRIVING THE SAME

(75) Inventor: Masafumi Matsui, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/288,142

(22) Filed: Nov. 3, 2011

(65) Prior Publication Data

US 2012/0050350 A1 Mar. 1, 2012

Related U.S. Application Data

(63) Continuation of application No. PCT/JP2010/002858, filed on Apr. 21, 2010.

(30) Foreign Application Priority Data

May 22, 2009 (JP) ................................ 2009-124735

(51) Int. Cl.
*G09G 3/30* (2006.01)
*G09G 5/00* (2006.01)
*G06F 3/038* (2013.01)

(52) U.S. Cl.
USPC .............................. 345/76; 345/204; 345/690

(58) Field of Classification Search
USPC ..................................... 345/76–78, 204, 690
See application file for complete search history.

(56) References Cited

U.S. PATENT DOCUMENTS 6,362,798 B1 3/2002 Kimura et al.
6,542,138 B1 * 4/2003 Shannon et al. ................ 345/76
7,173,584 B2 2/2007 Kimura et al.
7,474,046 B2 1/2009 Furuie et al.
7,535,444 B2 5/2009 Kim
7,876,294 B2 1/2011 Sasaki et al.
8,059,068 B2 11/2011 Kimura
2002/0044140 A1 4/2002 Inukai
2002/0070913 A1 6/2002 Kimura et al.
2003/0090481 A1 5/2003 Kimura
2003/0169218 A1 9/2003 Kimura et al.
2005/0206590 A1 9/2005 Sasaki et al.
2006/0066530 A1 * 3/2006 Azami et al. .................... 345/76
2006/0114176 A1 6/2006 Furuie et al.

(Continued)

FOREIGN PATENT DOCUMENTS

CN 1791290 6/2006
CN 101310318 11/2008

(Continued)

OTHER PUBLICATIONS

R.M.A. Dawson et al., "The Impact of the Transient Response of Organic Light Emitting Diodes on the Design of Active Matrix OLED Displays", IEDM '98, Technical Digest, 1998, pp. 875-878.

(Continued)

*Primary Examiner* — Jonathan Horner
(74) *Attorney, Agent, or Firm* — Greenblum & Bernstein, P.L.C.

(57) ABSTRACT

A display device includes luminescence pixels arranged in rows and columns. Each of gate lines and reset lines correspond to one of the rows, and signals lines each correspond to one of the columns. Each luminescence pixels includes a luminescence element, a switching transistor, a drive transistor which supplies current to the luminescence element, and a reset transistor. The reset transistor includes a gate terminal connected to a corresponding reset line, one of a source and drain terminal connected to a source or drain terminal of the drive transistor, and the other of the source and drain terminal connected to a corresponding gate line. A capacitor is connected between the gate terminal and the source terminal of the drive transistor.

15 Claims, 13 Drawing Sheets

(56) References Cited

U.S. PATENT DOCUMENTS

| | | | | |
|---|---|---|---|---|
| 2006/0256047 | A1 | 11/2006 | Kimura et al. | |
| 2007/0057873 | A1 | 3/2007 | Uchino et al. | |
| 2007/0126664 | A1 | 6/2007 | Kimura | |
| 2007/0210720 | A1 | 9/2007 | Kimura | |
| 2008/0001857 | A1* | 1/2008 | Yoo | 345/76 |
| 2008/0291125 | A1 | 11/2008 | Yamashita et al. | |
| 2008/0316152 | A1 | 12/2008 | Kimura et al. | |
| 2009/0251493 | A1 | 10/2009 | Uchino et al. | |
| 2010/0328294 | A1 | 12/2010 | Sasaki et al. | |
| 2011/0090210 | A1 | 4/2011 | Sasaki et al. | |
| 2011/0122124 | A1 | 5/2011 | Kimura et al. | |

FOREIGN PATENT DOCUMENTS

| | | |
|---|---|---|
| JP | 11-272233 | 10/1999 |
| JP | 2003-216110 | 7/2003 |
| JP | 2003-255897 | 9/2003 |
| JP | 2003-271095 | 9/2003 |
| JP | 2004-347993 | 12/2004 |
| JP | 2006-259374 | 9/2006 |
| JP | 2007-133282 | 5/2007 |
| JP | 2007-179041 | 7/2007 |
| JP | 2008-203655 | 9/2008 |
| JP | 2008-287139 | 11/2008 |

OTHER PUBLICATIONS

International Search Report in PCT/JP2010/002858, mailing date of May 25, 2010.

China Office action, mail date is Aug. 28, 2013 along with English language translation thereof.

* cited by examiner

DISPLAY DEVICE AND METHOD OF DRIVING THE SAME

CROSS REFERENCE TO RELATED APPLICATION

This is a continuation application of PCT Application No. PCT/JP2010/002858 filed on Apr. 21, 2010, designating the United States of America, the disclosure of which, including the specification, drawings and claims, is incorporated herein by reference in its entirety.

The disclosure of Japanese Patent Application No. 2009-124735, filed on May 22, 2009, including the specification, drawings, and claims is incorporated herein by reference in its entirety.

BACKGROUND OF THE INVENTION

1. Field of the Invention

The present invention relates to active matrix image display devices using a current-driven luminescence element such as an organic electroluminescence (EL) element, and so on.

2. Description of the Related Art

Although organic EL elements represent the gray scale through current control, active matrix organic EL display devices have the problem that, due to variation in threshold voltage in drive transistors which drive the respective organic EL elements, luminance unevenness occurs even when the same signal voltage is provided to the pixels. Compensating the threshold voltage of the drive transistors of the organic EL elements is necessary for resolving luminance unevenness and producing an even screen. As a threshold voltage compensation circuit for suppressing variation in the threshold voltage of the drive transistors, there is a method of detecting the threshold voltage of a drive transistor by using four transistors per pixel (for example, see Non-Patent Reference 1: R. M. A. Dawson, et al, IEDM '98, Technical Digest, 1998, p. 875). Furthermore, there is a method of detecting the threshold voltage of a drive transistor by using three transistors per pixel, and scanning the voltage of a power source line (for example, see Patent Reference 1: Japanese Unexamined Patent Application Publication No. 2006-259374).

SUMMARY OF THE INVENTION

However, the method in Non-Patent Reference 1 uses four transistors per pixel, and thus there is concern over a decrease in yield due to an increase in the number of transistors to be integrated following an increase in the size of a display.

Furthermore, although the method in Patent Reference 1 has a small number of transistors which means that high productivity can be expected when implemented as a display, there is a need for scanning the power source line. In order to scan the power source line, the power source line needs to be wired one-dimensionally. However, with one-dimensional wiring, crosstalk, in which the periphery of a display image becomes dark, easily occurs due to a drop in power source line voltage that accompanies an increase in the size of the display, and thus there is the problem of not being able to cope with increased screen size.

The present invention was conceived in order to solve the aforementioned problems and has as an object to provide a display device which compensates the threshold voltage of drive elements using a small number of elements, without performing the scanning of the power source line. Furthermore, providing a method of driving such a display device is also included as an object of the present invention.

In order to solve the aforementioned problems, the display device according to an aspect of the present invention is a display device which includes: luminescence pixels arranged in rows and columns; gate lines and reset lines, each of the gate lines and each of the reset lines being provided to a corresponding one of the rows of the luminescence pixels; and signal lines, each provided to a corresponding one of the columns of the luminescence pixels, wherein each of the luminescence pixels includes: a first switching transistor having (i) one of a source terminal and a drain terminal connected to a corresponding one of the signal lines, and (ii) a gate terminal connected to a corresponding one of the gate lines; a luminescence element which produces luminescence according to a flow of current; a drive transistor which supplies current to the luminescence element and has (i) a gate terminal connected to an other of the source terminal and the drain terminal of the first switching transistor, and (ii) one of a source terminal and a drain terminal connected to the luminescence element; a reset transistor having (i) a gate terminal connected to a corresponding one of the reset lines, (ii) one of a source terminal and a drain terminal connected to the one of the source terminal and the drain terminal of the drive transistor; and a capacitor element having one end connected to the gate terminal of the drive transistor, and an other end connected to the one of the source terminal and the drain terminal of the drive transistor, the display device further including a drive unit configured to supply an ON signal or an OFF signal to each of the first switching transistor and the reset transistor so as to control turning ON and OFF of the first switching transistor and the reset transistor, an other of the source terminal and the drain terminal of the reset transistor is connected to the gate line provided in a same row as the reset transistor, and the drive unit is configured to: supply the ON signal to the gate line to which the other of the source terminal and the drain terminal of the reset transistor is connected, so as to place the gate line in an active state in which the first switching transistor is turned ON, while supplying the OFF signal to the reset line so as to place the reset line in an inactive state in which the reset transistor is turned OFF, so as to set a predetermined reference voltage to the one end of the capacitor element via the signal line; and after the predetermined reference voltage is set to the one end of the capacitor element, supply the OFF signal to the gate line so as to place the gate line in the inactive stage in which the first switching transistor is turned OFF, while supplying the ON signal to the reset line so as to place the reset line in the active state in which the reset transistor is turned ON, so as to set the other end of the capacitor element to a low level voltage.

Accordingly, it is possible to detect the threshold voltage of the drive transistor using three transistors per luminescence pixel, without scanning the power line, and to cause the luminescence element to produce light with the threshold voltage of the drive transistor being compensated. In this manner, the variation in the threshold voltage of the drive transistors is compensated, and thus luminance unevenness can be overcome.

Furthermore, the display device may further include a drive unit configured to place the reset line in the active state in which the reset transistor turns ON, while placing the gate line to which the other of the source terminal and the drain terminal of the reset transistor is connected in the inactive state in which the first switching transistor turns OFF.

Accordingly, since the voltage of the source terminal of the drive transistor can be made the same as the voltage of the gate line connected to the other of the source terminal and the drain terminal of the reset transistor, the voltage of the source terminal of the drive transistor can be set by using the voltage of the gate line.

Furthermore, the drive unit may be further configured to selectively supply, to the signal lines, one of the predetermined reference voltage and a signal voltage that is greater than the predetermined reference voltage, and a voltage in the inactive state of the respective gate lines may be a voltage that is lower than the predetermined reference voltage by at least a threshold voltage of the drive transistor.

Accordingly, when the reset transistor is turned ON, the voltage of the source terminal of the drive transistor can be reliably set to a voltage that is lower than the reference voltage by at least the drive transistor threshold voltage. Therefore, the detection of the threshold voltage of the drive transistor can be performed reliably.

Furthermore, the other of the source terminal and the drain terminal of the reset transistor may be connected to the gate line provided in a same row as the reset transistor.

Furthermore, the drive unit may be further configured to place the gate line provided in the same row in the active state in which the first switching transistor is turned ON, and place the reset line in the inactive state in which the reset transistor is turned OFF, prior to placing the gate line provided in the same row in the inactive state.

Accordingly, the luminescence element can be optically-quenched reliably. Specifically, in the case where the voltage of the gate terminal of the drive transistor just before the luminescence production period is a sufficient voltage for supplying the current required for a luminescence element to produce luminescence, even after the gate line is placed in the inactive state, the luminescence element produces luminescence through the application of such voltage. In view of this, by placing the gate line in the active state and placing the reset line in the inactive state in this manner, the luminescence element can be optically-quenched reliably by applying, to the gate terminal drive transistor, the voltage used at the time of optical-quenching.

Furthermore, the other of the source terminal and the drain terminal of the reset transistor may be connected to a gate line provided in a next row.

Accordingly, even when the gate line of the same row is placed in the active state and the reset line is placed in the active state, the voltage of the source terminal of the drive transistor can be set to the voltage of the gate line of the next row. As a result, by setting the voltage of the gate line of the next row to a voltage that is lower than the reference voltage by at least the threshold voltage of the drive transistor, the detection of the threshold voltage of the drive transistor can be performed reliably. Specifically, compared to when the reset transistor is connected to the gate line of the same row, the optical-quenching of the luminescence pixels and the setting of the voltage of the source terminal of the drive transistor can be performed at the same time, and thus more time can be allotted to the detection of the threshold voltage of the drive transistor in one frame period.

Furthermore, the one of the source terminal and the drain terminal of the reset transistor and the other end of the capacitor element may be connected to the one of the source terminal and the drain terminal of the drive transistor via a predetermined element.

With this, it is possible to suppress the fluctuation of pixel current, which is the current supplied by the drive transistor to the luminescence element, caused by variation in the parasitic capacitance of luminescence elements. For example, when the drive circuit supplies the same signal voltage to the luminescence pixels, it becomes possible to suppress the variation of the potential of the connection point between the luminescence element and the drive transistor of the respective luminescence pixels. The reason why variation can be suppressed shall be described below.

When a predetermined signal voltage is supplied to a luminescence pixel, the potential of the connection point between the luminescence element and the drive transistor is defined by the capacitance distribution of the parasitic capacitance of the luminescence element and the capacitance of the capacitor element. However, the parasitic capacitance of the luminescence element varies with each luminescence element, and thus, even when the same signal voltage is supplied to the luminance pixels, the potential of the connection point between the luminescence element and the drive transistor is not the same, that is, there is variation among the luminance pixels. Therefore, due to the variation in the potential of the connection point between the luminescence element and the drive transistor, the current supplied to the respective luminescence elements also varies.

In response, by connecting the other end of the capacitor element and the connection point between the luminescence element and the drive transistor via a predetermined element, it is possible to reduce the effect the parasitic capacitance of the luminescence element has on the potential of the other end of the capacitor element. Therefore, it becomes possible to reduce the effect the parasitic capacitance of the luminescence element has on the held voltage of the capacitor element which is the potential difference between the one end and the other end of the capacitor element.

Therefore, it is possible to reduce the effect of the parasitic capacitance of the luminescence element, and cause the luminescence element to produce luminescence precisely according to the signal voltage.

Furthermore, each of the luminescence pixels may further include a second switching transistor having (i) one of a source terminal and a drain terminal connected to the one of the source terminal and the drain terminal of the reset transistor and the other end of the capacitor element, and (ii) an other of the source terminal and the drain terminal connected to the one of the source terminal and the drain terminal of the drive transistor.

Accordingly, by turning the second switching transistor ON and OFF, it is possible to switch between conduction and non-conduction, respectively, between (i) one of the source terminal and the drain terminal of the reset transistor and the other end of the capacitor element and (ii) the connection point between the luminescence element and drive transistor. Therefore, for example, by supplying the gate terminal of the drive transistor with the signal voltage for causing the luminescence element to produce luminescence, in the period in which the second switching transistor is OFF, the potential of the other end of the capacitor element is not affected by the parasitic capacitance of the luminescence element. In other words, it becomes possible to reduce the effect the parasitic capacitance of the luminescence element has on the held voltage of the capacitor element. Stated differently, it is possible to inhibit the effect of the parasitic capacitance of the luminescence element, and cause the luminescence element to produce luminescence at the precise luminance corresponding to the signal voltage.

Furthermore, each of the drive transistor, the first switching transistor, and the reset transistor may be an n-type transistor element.

Furthermore, the luminescence element may be an organic electroluminescence (EL) element.

Furthermore, the method of driving a display device according to an aspect of the present invention is a method of driving a display device, the display device including: luminescence pixels arranged in rows and columns; gate lines and reset lines one each of which is provided to a corresponding one of the rows of the luminescence pixels; and signal lines each of which is provided to a corresponding one of the columns of the luminescence pixels and selectively supplied with one of a reference voltage and a signal voltage that is greater than the reference voltage, each of the luminescence pixels including: a first switching transistor having (i) one of a source terminal and a drain terminal connected to a corresponding one of the signal lines, and (ii) a gate terminal connected to a corresponding one of the gate lines; a luminescence element which produces luminescence according to a flow of current; a drive transistor which supplies current to the luminescence element and has (i) a gate terminal connected to an other of the source terminal and the drain terminal of the first switching transistor, and (ii) one of a source terminal and a drain terminal connected to the luminescence element; a reset transistor having (i) a gate terminal connected to a corresponding one of the reset lines, (ii) one of a source terminal and a drain terminal connected to the one of the source terminal and the drain terminal of the drive transistor; and a capacitor element having one end connected to the gate terminal of the drive transistor, and an other end connected to the one of the source terminal and the drain terminal of the drive transistor, the display device further including a drive unit configured to supply an ON signal or an OFF signal to each of the first switching transistor and the reset transistor so as to control turning ON and OFF of the first switching transistor and the reset transistor, and an other of the source terminal and the drain terminal of the reset transistor being connected to the gate line provided in a same row as the reset transistor, the method including resetting which includes: supplying the ON signal to the gate line to which the other of the source terminal and the drain terminal of the reset transistor is connected, so as to place the gate line in an active state in which the first switching transistor is turned ON, while supplying the OFF signal to the reset line so as to place the reset line in an inactive state in which the reset transistor is turned OFF, so as to set a predetermined reference voltage to the one end of the capacitor element via the signal line; and after the predetermined reference voltage is set to the one end of the capacitor element, supplying the OFF signal to the gate line so as to place the gate line in the inactive stage in which the first switching transistor is turned OFF, while supplying the ON signal to the reset line so as to place the reset line in the active state in which the reset transistor is turned ON, so as to set the other end of the capacitor element to a low level voltage.

Furthermore, the method may further include: detecting a threshold voltage of the drive transistor by turning ON the first switching transistor, after the resetting; holding, in the capacitor element, the threshold voltage detected in the detecting; supplying a signal voltage which causes the luminescence element to produce the luminescence, to the gate terminal of the drive transistor, after the holding; and causing the luminescence element to produce the luminescence by turning OFF the first switching transistor so that a current corresponding to a potential difference between the gate terminal and the source terminal of the drive transistor flows to the luminescence element.

Accordingly, since, in the causing, the drive transistor supplies a current corresponding to a voltage obtained by adding the signal voltage and the threshold voltage, the luminescence pixel is not affected by the threshold voltage and is capable of producing luminescence corresponding to the signal voltage.

Furthermore, the detecting may include: the turning-ON of the first switching transistor; and turning-OFF the first switching transistor, after the turning-ON, and the turning-ON and the turning-OFF may be repeated at least once after the turning-OFF is executed.

Accordingly, since it is possible to detect the threshold voltage of the drive transistor over plural horizontal periods, precise threshold voltage detection is possible.

Furthermore, in the turning-ON, the predetermined reference voltage may be supplied to the signal line provided to a same column as the first switching transistor, and in the turning-OFF, the signal voltage or the predetermined reference voltage may be supplied to the signal line.

Accordingly, the voltage of the signal line in the turning-ON can be set to the voltage for detecting the threshold voltage of the drive transistor of the column corresponding to the signal line, and the voltage of the signal line in the turning-OFF can be set to the signal voltage of the luminescence pixel of the corresponding column. Therefore, for example, by setting the voltage of the signal line to the reference voltage in the first half of one horizontal period and setting the voltage of the signal line to the signal voltage in the second half of one horizontal period, one horizontal period can be divided, with the first half being a period for threshold voltage detection and the second half being a signal voltage writing period.

Furthermore, each of the luminescence pixels further includes a second switching transistor having (i) one of a source terminal and a drain terminal connected to the one of the source terminal and the drain terminal of the reset transistor and the other end of the capacitor element, and (ii) an other of the source terminal and the drain terminal connected to the one of the source terminal and the drain terminal of the drive transistor, in the detecting, the threshold voltage of the drive transistor is detected by turning ON the first switching transistor in a state where the second switching transistor is turned ON, in the holding, the second switching transistor is turned OFF so that the threshold voltage detected in the detecting is held in the capacitor element, in the supplying of a signal voltage, the signal voltage is supplied to the gate terminal of the drive transistor in a state where the second switching transistor is turned OFF, by supplying the signal voltage to the signal line in a period in which the first switching transistor is ON, and in the causing, the luminescence element is caused to produce the luminescence by switching the second switching transistor from OFF to ON after switching the first switching transistor from ON to OFF so that the current corresponding to a potential difference between the gate terminal and the source terminal of the drive transistor flows to the luminescence element.

Accordingly, since the signal voltage is supplied to the gate terminal of the drive transistor in the period in which the second switching transistor is OFF, the potential of the other end of the capacitor element is not affected by the parasitic capacitance of the luminescence element. In other words, it becomes possible to reduce the effect the parasitic capacitance of the luminescence element has on the held voltage of the capacitor element. Stated differently, it is possible to inhibit the effect of the parasitic capacitance of the luminescence element, and cause the luminescence element to produce luminescence at the precise luminance corresponding to the signal voltage.

Furthermore, the other of the source terminal and the drain terminal of the reset transistor is connected to a gate line provided in a same row as the reset transistor, and the method of driving a display device may further include optically-quenching the luminescence element by turning ON the first switching transistor and turning OFF the reset transistor prior to the resetting.

As described above, the display device according to the present invention can compensate the threshold voltage the drive element using a small number of elements and without performing the scanning of the power source line.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Embodiment 1

The display device according to Embodiment 1 of the present invention is a display device which includes: luminescence pixels arranged in rows and columns; gate lines and reset lines, each of the gate lines and each of the reset lines being provided to a corresponding one of the rows of the luminescence pixels; and signal lines, each provided to a corresponding one of the columns of the luminescence pixels, wherein each of the luminescence pixels includes: a first switching transistor having (i) one of a source terminal and a drain terminal connected to a corresponding one of the signal lines, and (ii) a gate terminal connected to a corresponding one of the gate lines; a luminescence element which produces luminescence according to a flow of current; a drive transistor which supplies current to the luminescence element and has (i) a gate terminal connected to an other of the source terminal and the drain terminal of the first switching transistor, and (ii) one of a source terminal and a drain terminal connected to the luminescence element; a reset transistor having (i) a gate terminal connected to a corresponding one of the reset lines, (ii) one of a source terminal and a drain terminal connected to the one of the source terminal and the drain terminal of the drive transistor; and a capacitor element having one end connected to the gate terminal of the drive transistor, and an other end connected to the one of the source terminal and the drain terminal of the drive transistor, and an other of the source terminal and the drain terminal of the reset transistor is connected to the gate line provided in a same row as the reset transistor.

Accordingly, it is possible to detect the threshold voltage of the drive transistor using three transistors per luminescence pixel, without scanning the power line, and to cause the luminescence element to produce light with the threshold voltage being compensated. In this manner, the variation in the threshold voltage of the drive transistors is compensated, and thus luminance unevenness can be overcome.

Hereinafter, a display device according to Embodiment 1 of the present invention shall be described with reference to the Drawings.

Figure 1:
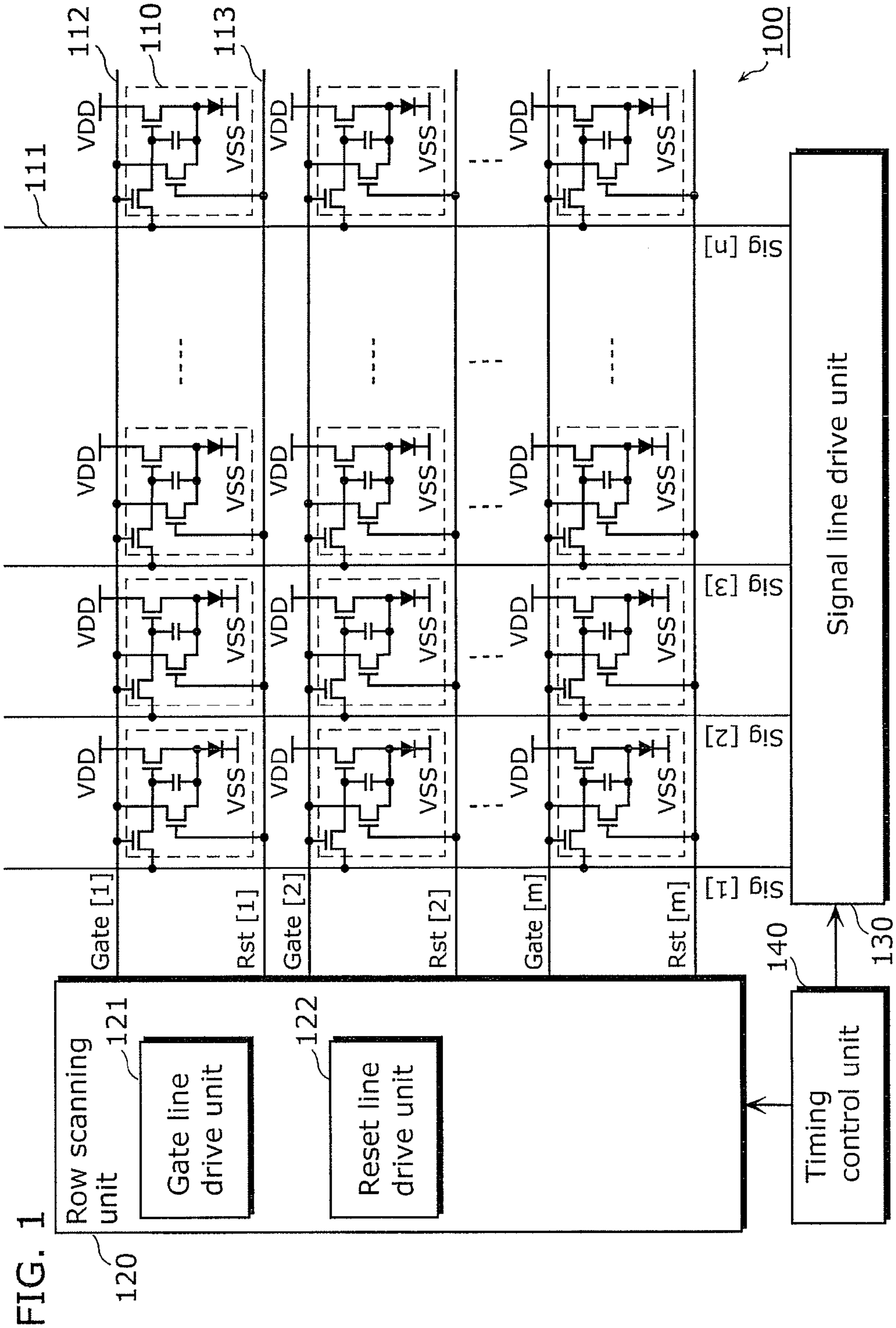
FIG. 1 is a block diagram showing a configuration of a display device according to Embodiment 1.

FIG. 1 is a block diagram showing a configuration of the display device according to Embodiment 1.

A display device 100 in the figure is, for example, an active matrix organic EL display device using an organic EL element, and includes plural luminescence pixels 110 arranged in a matrix, a row scanning unit 120, a signal line drive unit 130, and a timing control unit 140.

The luminescence pixels 110 are arranged, for example, in a n-row×m-column matrix, and each produces luminescence according to the gate pulse, reset pulse, and signal voltage outputted from the row scanning unit 120 and signal line drive unit 130 via a signal line 111, a gate line 112, and a reset line 113, with the threshold voltage of the corresponding drive transistor being compensated.

The row scanning unit 120 is connected to gate lines 112 and reset lines 113, one each of which is provided to a corresponding one of the rows of the luminescence pixels 110. The row scanning unit 120 sequentially scans the luminescence pixels 110 on a row basis by outputting a scanning signal to the respective gate lines 112 and the respective reset lines 113. Specifically, the row scanning unit 120 includes a gate line drive unit 121 which scans the respective gate lines 112, and a reset line drive unit 122 which scans the respective reset lines 113. By outputting a corresponding gate pulse Gate [k] (where k is an integer satisfying $1 \leq k \leq m$) to each of the gate lines 112, the gate line drive unit 121 selectively provides the corresponding luminescence pixel 110 with (i) the reference voltage for each of the luminescence pixels 110 corresponding to the respective gate lines 112, and (ii) a signal voltage that is greater than the reference voltage. By outputting a corresponding reset pulse Rst [k] to each of the reset lines 113, the reset line drive unit 122 controls the timing for applying, to the luminescence pixel 110 corresponding to the reset line 113, the voltage of the gate line 112, that is, the low level voltage or the high level voltage of the gate pulse Gate [k].

The signal line drive unit 130 is connected to the respective signal lines 111, and provides the respective signal lines 111 with a corresponding signal voltage Vdata (for example, 2 to 8 V) or reset voltage Vreset (for example, 0 V), as a signal line voltage Sig [j] (where j is an integer satisfying $1 \leq j \leq n$). The signal voltage Vdata is a voltage that corresponds to the luminescence production luminance of a luminescence pixel 110, and the reset voltage Vreset is a voltage for optically-quenching the luminescence pixel 110 or for detecting the threshold voltage of a drive transistor.

The timing control unit 140 instructs the drive timing to the row scanning unit 120 and the signal line drive unit 130. It should be noted that the row scanning unit 120, the signal line drive unit 130, and the timing control unit 140 correspond to the drive unit in the present invention.

Next, the detailed configuration of the luminescence pixel 110 shall be described. It should be noted that although the configuration for one luminescence pixel 110 is described below, each of the plural luminescence pixels 110 shown in FIG. 1 has the same configuration. Furthermore, the gate pulse Gate [k] outputted from the gate line drive unit 121 to the gate line 112 corresponding to the luminescence pixel 110 is simply referred to as a gate pulse Gate, the reset pulse Rst [k] outputted from the reset line drive unit 122 to the reset line 113 corresponding to the luminescence pixel 110 is simply referred to as a reset pulse Rst, and the signal line voltage Sig [j] outputted to the signal line 111 corresponding to the luminescence pixel 110 is simply referred to as a signal line voltage Sig.

Figure 2:
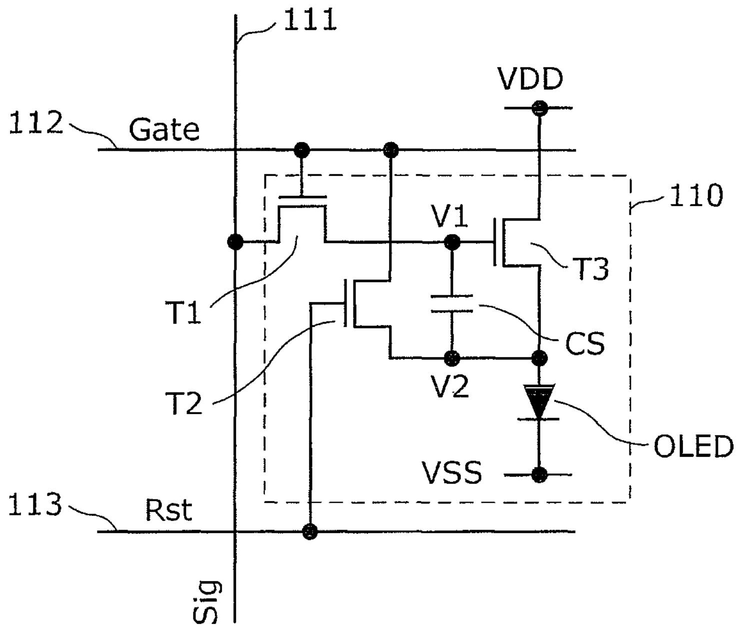
FIG. 2 is a circuit diagram showing a detailed configuration of a luminescence pixel.

FIG. 2 is a circuit diagram showing the detailed configuration of the luminescence pixel 110 shown in FIG. 1. It should be noted that the signal line 111, gate line 112, and reset line 113 which correspond to the luminescence pixel 110 are also shown in the figure.

The luminescence pixel 110 includes a luminescence element OLED, a row selection transistor T1, a reset transistor T2, a drive transistor T3, and a capacitor element CS.

The luminescence element OLED is an element that produces luminescence according to the flow of current, and is, for example, an organic EL element having an anode connected to a source terminal of a drive transistor, and a cathode connected to a power source line of a voltage VSS (for example, 0 V). The luminescence element OLED produces luminescence according to current which flows according to the application of the signal voltage Vdata to a gate terminal of the drive transistor T3 via the signal line 111 and the row selection transistor T1. Therefore, the luminance of the luminescence element OLED corresponds to the size of the signal voltage Vdata applied to the signal line 111.

The row selection transistor T1, the reset transistor T2, and the drive transistor T3 are, for example, n-type TFTs (thin film transistors).

The row selection transistor T1, which corresponds to the first switching transistor in the present invention, switches between the application and non-application of a signal voltage to the gate terminal of the drive transistor T3, which is the control terminal thereof, according to the voltage of the gate line 112. Specifically, the row selection transistor T1 has a gate terminal connected to the gate line 112, one of a source terminal and a drain terminal connected to the signal line 111, and the other of the source terminal and the drain terminal connected to the gate terminal of the drive transistor T3. Therefore, the row selection transistor T1 switches between conduction and non-conduction between the signal line 111 and the gate terminal of the drive transistor T3, according to the voltage applied to the gate line 112. More specifically, in a period in which the gate pulse Gate is at the high level, the row selection transistor T1 supplies the gate terminal of the drive transistor T3 with the reference voltage Vreset or the signal voltage Vdata applied to the signal line 111.

The reset transistor T2 sets V2, which is the voltage of the source terminal of the drive transistor T3, in order to detect the threshold voltage of the drive transistor T3. Specifically, the reset transistor T2 has a gate terminal connected to the reset line 113, one of a source terminal and a drain terminal connected to the gate line 112, and the other of the source terminal and the drain terminal connected to the source terminal of the drive transistor T3. Therefore, in the period in which the reset pulse Rst is at the high level, the reset transistor T2 switches to conduction between the gate line 112 and the source terminal of the drive transistor T3 so as to set the voltage of the gate line 112 to the voltage of V2.

The drive transistor T3 provides current to the luminescence element OLED. Specifically, the drive transistor T3 has its gate terminal connected to the signal line 111 via the row selection transistor T1, a drain terminal connected to the power source line of a voltage VDD (for example, 10 V), and a source terminal connected to the anode of the luminescence element OLED. The drive transistor T3 converts the voltage supplied to its the gate terminal into a current corresponding to the size of the voltage. Therefore, in a period in which the voltage of the gate line 112 is at the high level, the drive transistor T3 supplies the luminescence element OLED with a current corresponding to the voltage supplied to the signal line 111, that is, the reference voltage Vreset or the signal voltage Vdata.

However, a current corresponding to the reference voltage Vreset is insufficient to cause the luminescence element OLED to produce luminescence, and the luminescence element OLED does not produce luminescence when V1, which is the voltage of the gate terminal of the drive transistor T3, is the reference voltage Vreset. On the other hand, when V1 is the signal voltage Vdata, a current which is sufficient for causing the luminescence element OLED to produce luminescence flows, and thus the luminescence element OLED produces luminescence at a luminance corresponding to the signal voltage Vdata.

The capacitor element CS holds the gate-source voltage of the drive transistor T3, by having one end connected to the gate terminal of the drive transistor T3, and the other end connected to the source terminal of the drive transistor T3. In other words, the capacitor element CS is capable of holding the threshold voltage of the drive transistor T3.

Figure 3:
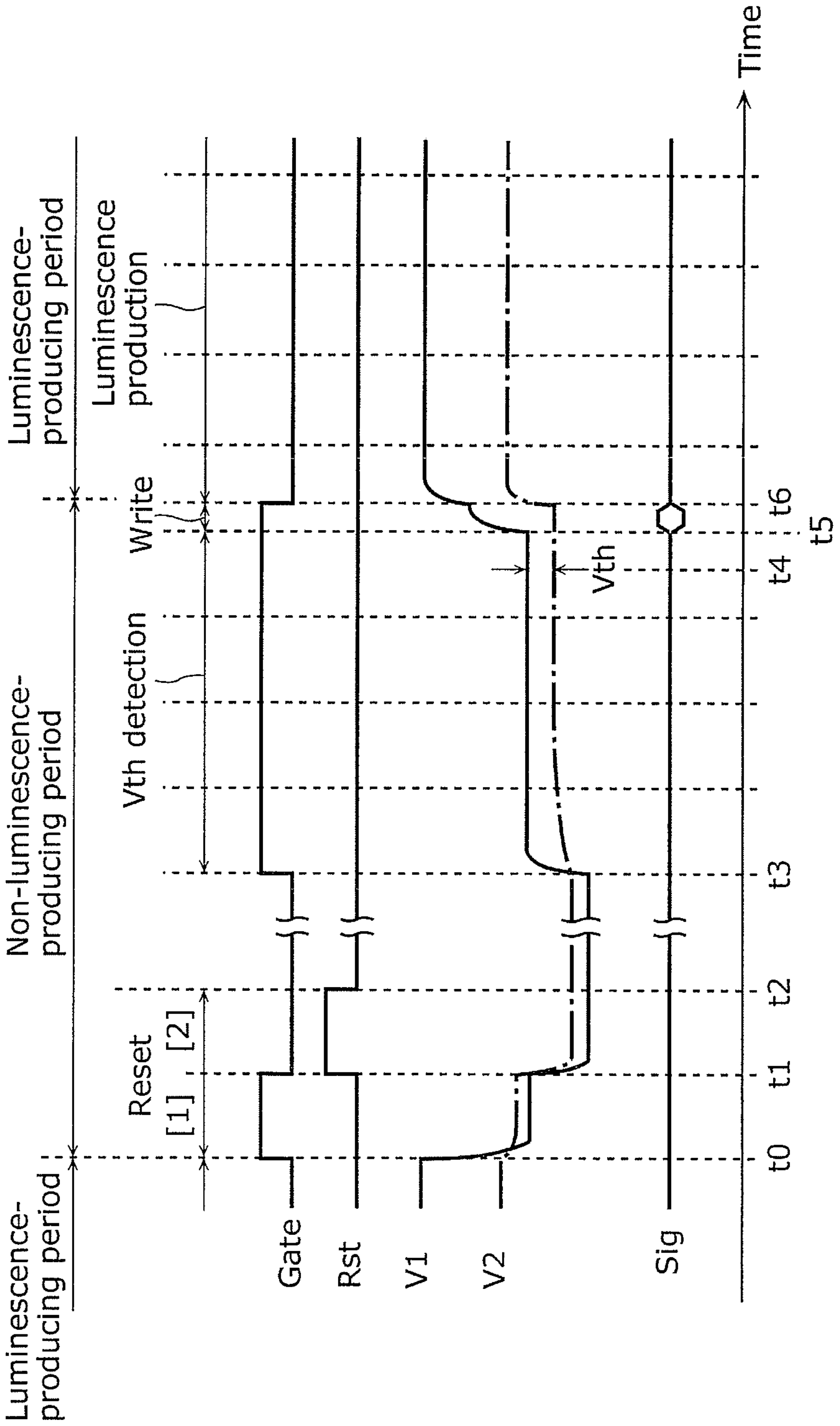
FIG. 3 is a timing chart showing the operation of the display device.
Figure 4:
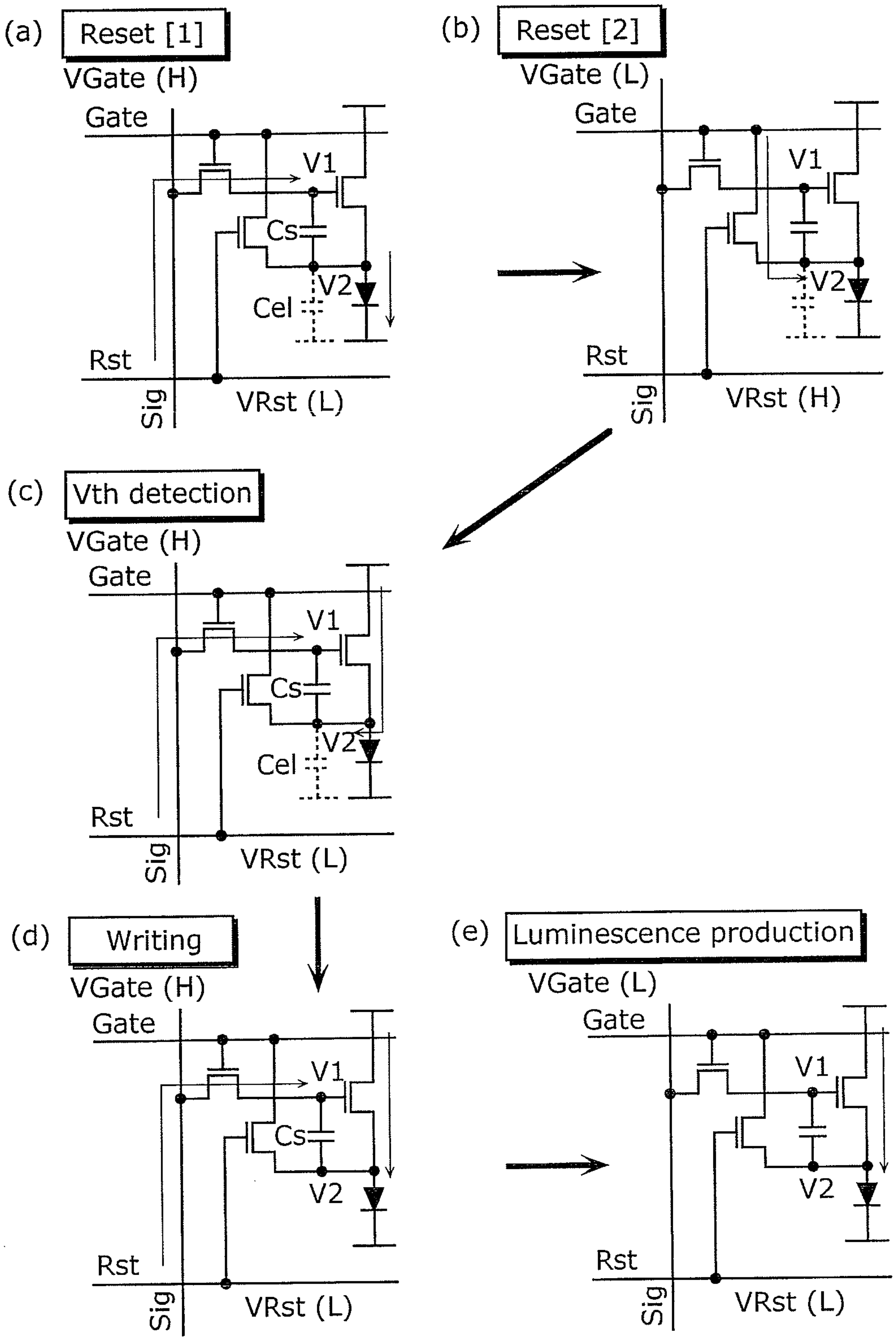
FIG. 4 is a diagram schematically showing the flow of current in a luminescence pixel.

Next, a method of driving the above-described display device 100 shall be described using FIG. 3 and FIG. 4.

FIG. 3 is a timing chart showing the operation of the display device 100 according to Embodiment 1. In the figure, time is indicated by the horizontal axis and the respective waveforms of the gate pulse Gate, and the reset pulse Rst, V1 which is the voltage of the gate terminal of the drive transistor T3, V2 which is the voltage of the source terminal of the drive transistor T3, and the signal line voltage Sig applied to the signal line 111 are shown from top to bottom in the vertical direction.

FIG. 4 is a diagram schematically showing the flow of current in the luminescence pixel 110 in the display device 100 according to Embodiment 1. Here, the high level voltage of the gate pulse Gate is denoted as VGate (H), the low level voltage of the gate pulse Gate is denoted as VGate (L), the high level voltage of the reset pulse Rst is denoted as VRst (H), and the low level voltage of the reset pulse Rst is denoted as VRst (L).

Prior to a time t0, the luminescence element OLED produces luminescence according to the signal voltage Vdata in an immediately preceding vertical period. Specifically, V1 is the signal voltage Vdata in the immediately preceding vertical period, and the drive transistor T3 supplies a drive current to the luminescence element OLED according to such signal voltage Vdata.

Next, in the time t0 (the start time of a reset [1] period), the row selection transistor T1 is turned ON by switching the gate pulse Gate from the low level to the high level. The VGate (L) is, for example, −5 V, and the VGate (H) is, for example, 12 V.

By turning ON the row selection transistor T1, there is conduction between the signal line 111 and the gate terminal of the drive transistor T3, and V1 becomes equal to the voltage supplied to the signal line 111. In the time t0, the voltage of the signal line 111 is Vreset which is the reference voltage, and thus V1 transitions to Vreset in the reset [1] period. Here, the voltage of Vreset is a voltage which satisfies the condition in expression 1 below. However, Vth (EL) is the luminescence production starting voltage of the luminescence element OLED, and Vth (TFT) is the threshold voltage between the gate terminal and source terminal of the drive transistor T3.

$$Vreset < Vth(EL) + Vth(\mathrm{TFT}) \quad \text{(Expression 1)}$$

In other words, Vreset, is a voltage for reliably causing the optical-quenching of the luminescence element OLED.

Furthermore, since the reset pulse Rst is at the low level at this time, the reset transistor T2 is OFF. At this time, the voltage applied t the gate terminal of the drive transistor T3 is the reference voltage Vreset which is lower than the signal voltage of the preceding frame, and thus the current that can be provided by the drive transistor T3 to the luminescence element decreases. With this, V2 transitions from the luminescence production potential in the immediately preceding frame period to the luminescence production starting voltage Vth (EL) of the luminescence element OLED.

Next, in a time t1 (the start time of a reset [2] period), the gate pulse Gate is switched to the low level, and the reset pulse Rst is switched to the high level. Since the gate pulse Gate is switched to the low level, the row selection transistor T1 is turned OFF, and thus there is a state of non-conduction between the signal line 111 and the gate terminal of the drive transistor T3. On the other hand, since the reset pulse Rst is at the high level, the reset transistor T2 is turned ON, and there is conduction between the gate line 112 the source terminal of the drive transistor T3. Therefore, V2 becomes the low level voltage VGate (L) of the gate pulse Gate. Here, the VGate (L) is a voltage which satisfies expression 2 below.

$$VGate(L) < Vreset - Vth(\mathrm{TFT}) \quad \text{(Expression 2)}$$

Furthermore, due to the capacitor element CS inserted between the gate terminal of the drive transistor T3 and the anode of the luminescence element OLED, the voltage of V1 changes by as much as the voltage change of V2 from the reset [1] period to the reset [2] period. Specifically, since the voltage of V2 fluctuates by as much as VGate (L)−Vth (EL) from the reset [1] period through the reset [2] period, the voltage of V1 becomes Vreset+VGate (L)−Vth (EL) which is obtained by adding such change portion to the voltage of V1 in the reset [1] period.

Next, in a time t2 (the end time of the reset [2] period), the reset transistor T2 is turned OFF by the switching of the reset pulse Rst to the low level, and thus there is a state of non-conduction between the gate line 112 and the source terminal of the drive transistor T3. Therefore, the potential difference between V1 and V2 at this time is held in the capacitor element CS.

In the reset period shown in times t0 to t2 in FIG. 3, a voltage of a predetermined potential difference needs to be set in the capacitor element CS by setting the reference voltage Vreset from the signal line 111 to one end of the capacitor element CS and setting a fixed voltage to the other end of the capacitor element CS. This reset period is divided into the two periods of a period T1 (the times t0 to t1) which is the reset [1] period and a period T2 (the times t1 to t2) which is the reset [2] period, and the reference voltage Vreset is set to one end of the capacitor element CS in the period T1 and the fixed voltage is set to the other end of the capacitor element CS in the period T2.

Here, in the period T1, in order to set the reference voltage Vreset from the signal line 111 to one end of the capacitor element CS, it is necessary to turn ON the row selection transistor T1 by supplying the high level voltage VGate (H) to the gate line 112. On the other hand, in the period T2, in order to maintain the reference voltage Vreset that has been set to the one end of the capacitor element CS, it is necessary to turn OFF the row selection transistor T1 by supplying the low level voltage VGate (L) to the gate line 112. In supplying the low level voltage VGate (L) to the gate line 112, the low level voltage VGate (L) is applied on a row basis since the gate lines 112 are arranged on a row basis. This means that, in the period T2, there is the same state as when a fixed voltage VGate (L) is set on a row basis.

In view of this, in the period T2, in which the fixed voltage is set to the other end of the capacitor element CS, within the reset period, the gate line 112 that has been supplied with the low level voltage VGate (L) and has assumed the state of the fixed potential VGate (L) is used like a fixed power source line, and the other end of the capacitor element CS is connected to the gate line 112.

With this, the gate line 112 is also used as a power source line for supplying the fixed potential VGate (L), and the fixed potential VGate (L) is supplied to the other end of the capacitor element CS via the gate line 112, and thus it is possible to eliminate the power source line for supplying the fixed potential VGate (L) to the other end of the capacitor element CS. As a result, the fixed potential VGate (L) can be set to the other end of the capacitor element CS using a simple configuration.

Next, in a time t3 (the start time of a Vth detection period), the gate pulse Gate is switched to the high level and thus V1 transitions to Vreset again. At this time, a potential change corresponding to the capacitance ratio between the capacitance of the capacitor element CS and the parasitic capacitance between the anode and the cathode of the luminescence element OLED occurs in V2. As a result, V2 becomes a value as shown in expression 3.

$$V2 = \alpha VGate(L) + (1-\alpha)Vth(EL) \quad \text{(Expression 3)}$$

However, α=Cel/(Cs+Cel). Furthermore, Cs denotes the capacitance of the capacitor element CS, and Cel denotes the parasitic capacitance between the anode and the cathode of the luminescence element OLED.

Furthermore, here, the respective voltages and capacitances satisfy expression 4 and expression 5 below.

$$VGate(L) - (VGate(L) - Vth(EL)) \cdot Cs/(Cs+Cel) < Vth(EL) \quad \text{(Expression 4)}$$

$$Vreset - VGate(L) + (VGate(L) - Vth(EL)) \cdot Cs/(Cs+Cel) > Vth(TFT) \quad \text{(Expression 5)}$$

Expression 4 shows the condition under which the potential of V2 is equal to or lower than the threshold voltage Vth (EL) of the luminescence element OLED and the current flowing to the luminescence element OLED can be disregarded, even when a potential change corresponding to the capacitance ratio occurs in V2 in the time t3. Furthermore, expression 5 shows the condition under which a potential difference that is equal to or greater than the threshold voltage Vth (TFT) of the drive transistor T3 is held in the capacitor element CS even when the potential change occurs in V2 in the time t3. In expression 5, when the potential difference between V1 and V2 is greater than the threshold voltage Vth (TFT) of the drive transistor T3, the drive transistor T3 is turned ON, and current flows to the drive transistor T3. Specifically, current flows to the drive transistor T3 when V2 satisfies expression 2 in the reset [2] period, and expression 4 and expression 5 are satisfied in the time t3. This current flows until the potential difference between V1 and V2 becomes the threshold voltage Vth (TFT) of the drive transistor T3.

In a time t4, when the potential difference between V1 and V2 becomes the threshold voltage Vth (TFT) of the drive transistor T3, the drive transistor T3 is turned OFF, and the current ceases to flow. Therefore, here, the threshold voltage Vth (TFT) of the drive transistor T3 is held in the capacitor element CS.

Subsequently, in a writing period in times t5 and t6, the signal voltage Vdata is applied to the signal line 111. With this, the voltage of V1 becomes Vdata, and V2 in a time t5 satisfies expression 6.

$$V2=(1-\alpha)\cdot(V\text{data}-V\text{reset})+V\text{reset}-Vth(\text{TFT}) \qquad \text{(Expression 6)}$$

Therefore, the potential difference between V1 and V2, that is, the voltage Vgs between the gate and source terminals of the drive transistor T3 is as shown in expression 7.

$$Vgs=\alpha(V\text{data}-V\text{reset})+Vth(\text{TFT}) \qquad \text{(Expression 7)}$$

Specifically, in the writing period, a voltage obtained by adding the threshold voltage Vth (TFT) to the difference between the signal voltage Vdata and the reference voltage Vreset, that is, a voltage in which the threshold voltage Vth (TFT) has been compensated is written into Vgs.

Next, in a time t6, a current corresponding to the voltage written into the Vgs flows to the luminescence element OLED when the gate pulse Gate is switched to the low level. Specifically, since a current, which corresponds to a voltage in which the threshold voltage Vth (TFT) is compensated, flows to the luminescence element OLED, it is possible to solve the problem in which, even when the same signal voltage Vdata is provided, luminance unevenness occurs due to the variation in the characteristics of the respective drive transistors T3.

As described above, in the display device 100 according to the present embodiment, the reset transistor T2 is inserted between the gate line 112 and the source terminal of the drive transistor T3, and the low level voltage of the gate pulse Gate supplied to the gate line 112 is set as the voltage for detecting the threshold voltage of the drive transistor T3.

Accordingly, in the display device 100 according to the present embodiment, it is possible to detect the threshold voltage of the drive transistor T3 using three transistors per luminescence pixel 110, without scanning a power source line, and cause the luminescence element OLED to produce luminescence with the threshold voltage of the drive transistor T3 being compensated. Since the variation in the threshold voltage of the drive transistor T3 is compensated in the manner described above, luminance unevenness can be overcome.

Furthermore, since the voltage when the gate pulse Gate is at the low level is a voltage that is equal to or greater than the threshold voltage Vth (TFT) of the drive transistor T3 and lower than the reference voltage Vreset, the voltage of the source terminal of the drive transistor T3 can be set to a voltage that is equal to or greater than the threshold voltage Vth (TFT) of the drive transistor T3 and lower than the reference voltage Vreset, in the reset [2] period. Specifically, the voltage of V2 in the reset [2] period, that is, the VGate (L) can be set to a voltage that is lower than Vreset−Vth (TFT). Therefore, in the subsequent Vth detection period, the detection of the threshold voltage Vth (TFT) of the drive transistor T3 can be performed reliably.

Furthermore, before the gate pulse Gate is switched to the low level in the reset [2] period, the gate pulse Gate is set to the high level and the reset pulse Rst is set to the low level in the reset [1] period. With this, the luminescence element OLED can be optically-quenched. Specifically, the signal voltage Vdata in the immediately preceding frame period is applied to the gate terminal of the drive transistor T3 in the case where the operation in the reset [2] period is performed without providing the reset [1] period, and thus after the end of the reset [2] period, depending on the set value of such signal voltage Vdata, the voltage between the gate and source terminals of the drive transistor T3 remains greater than the threshold voltage Vth (TFT) and current corresponding to Vdata is caused to flow. As a result, the luminescence element OLED cannot be optically-quenched. As in the previous description, by providing the reset [1] period, the voltage of the gate terminal of the drive transistor T3 is set to the reference voltage Vreset, and thus, in the reset [2] period, V2 can be reliably set to the low level voltage VGate [L] of the gate pulse Gate while placing the drive transistor in the OFF state in which the voltage between the gate and source terminals of the drive transistor T3 is equal to or less than the threshold voltage Vth (TFT).

It should be noted that in the display device 100 according to the present embodiment, the detection of the threshold voltage may be performed over plural horizontal periods. With this, the period for causing the capacitor element CS to hold the threshold voltage Vth (TFT) can be prolonged, and thus the voltage held in the capacitor element CS is stabilized and high precision threshold voltage compensation can be realized.

(Modification of Embodiment 1)

Figure 5:
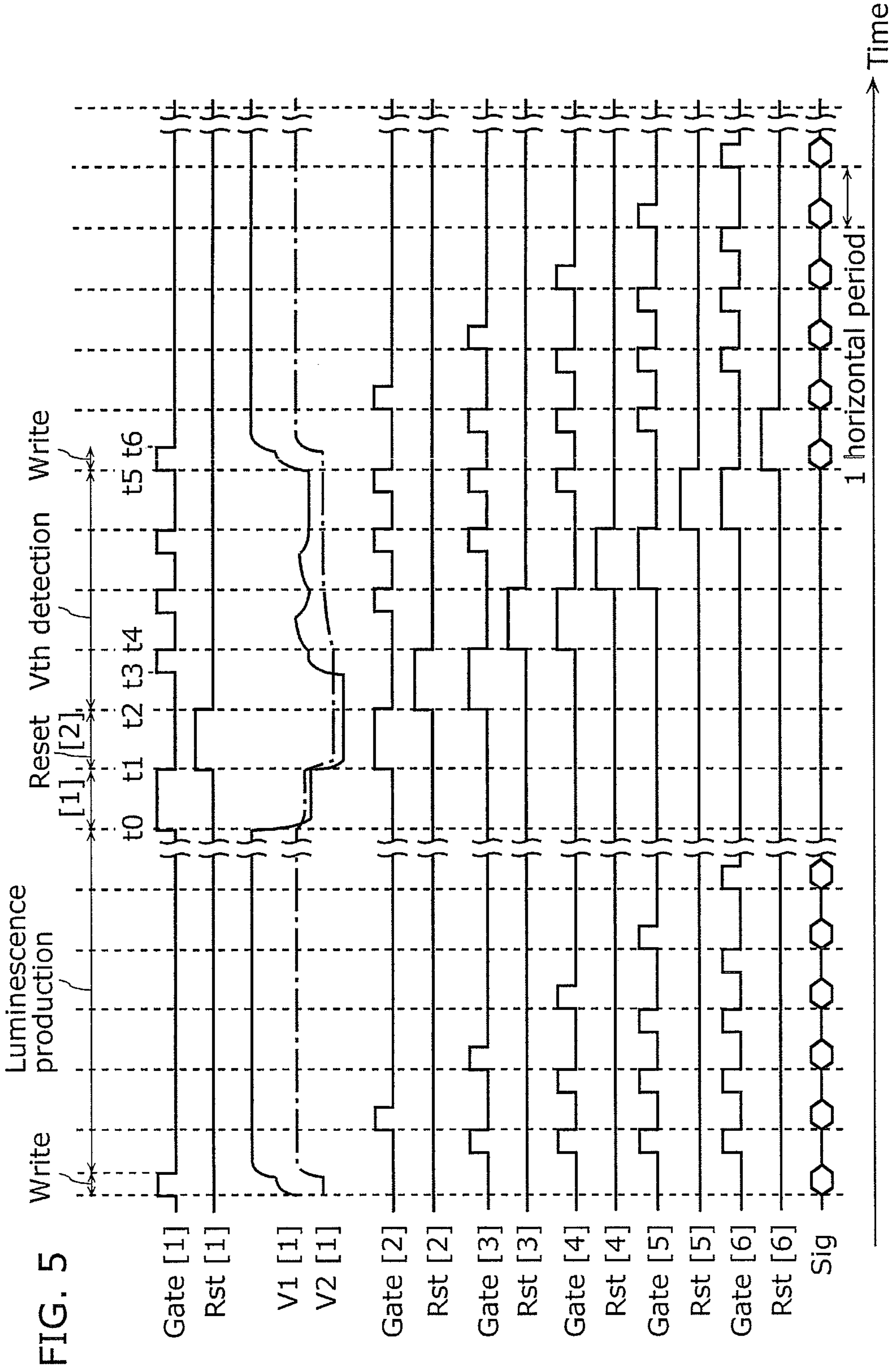
FIG. 5 is a timing chart showing the operation of the display device when detecting threshold voltage over plural horizontal periods.

FIG. 5 is a timing chart showing the operation of the display device 100 when detecting the threshold voltage over plural horizontal periods. In the figure, time is indicated by the horizontal axis, and shown from top to bottom in the vertical direction are: a gate pulse Gate [1] applied to the gate line 112 corresponding to a luminescence pixel in the first row; a reset pulse Rst [1] applied to the reset line 113; the voltage waveform of V1 [1] of the pixel in the first row; the voltage waveform of V2 [1] of the pixel in the first row; the gate pulses Gate [2] to Gate [6] of luminance pixels in the second to sixth rows, respectively; the reset pulses Rst [2] to Rst [6] of the luminance pixels in the second to sixth rows, respectively; and a signal line voltage Sig of the signal lines 111. It should be noted that the figure shows the timing chart corresponding to one column of luminescence pixels 110. Furthermore, among the gate pulses Gate [1] to Gate [m] and reset pulses Rst [1] to Rst [m] corresponding to each of the rows, those for only six rows are shown.

The signal line drive unit 130 supplies the signal lines 111 with the reference voltage Vreset in the second half of the respective horizontal periods, and supplies, in the first half of the respective horizontal periods, the signal voltage Vdata of the display pixels of the column to which the respective signal lines 111 correspond. Furthermore, offsetting by one horizontal period each, the gate line drive unit 121 and the reset line drive unit 122 supply the respective gate pulses Gate [1] to Gate [6] and the respective reset pulses Rst [1] to Rst [6] to the respective gate lines 112 and the respective reset lines 113.

First, in the reset [1] period and reset [2] period in times t0 to t2, the gate line drive unit 121 and the reset line drive unit 122 respectively switch the gate pulse Gate [1] to the high level once then to the low level, and switch the reset pulse Rst [1] to the high level as described in Embodiment 1, and thereby setting the voltage of V2 [1] to a voltage that is lower than the reference voltage Vreset by as much as the threshold voltage Vth (TFT). It should be noted that in the time t 1 which is one horizontal period after the gate line drive time t0, the gate pulse Gate [2] of the second row is switched to the high level, and a reset [1] period of the second row starts.

Next, in a time t3, by switching the gate pulse Gate [1] to the high level, V1 becomes the reference voltage and current flows to the drive transistor T3. Therefore V2 starts to rise.

Next, in a time t4, the reset pulse Rst [2] of the reset line 113 of the second row and the gate pulse Gate [3] of the gate line 112 of the third row fall.

Subsequently, through the switching of the gate pulse Gate [1] to the high level only in the second half of each horizontal period, V2 transitions to Vreset−Vth(TFT).

As described above, Vreset, which is the reference voltage, is supplied to the signal line 111 in the second half of each horizontal period, and Vdata corresponding to the luminance of the luminescence pixels 110 of the corresponding column is supplied to the signal line 111 in the first half of each horizontal period.

Therefore, in the Vth detection period, the reference voltage Vreset is supplied to V1 through the switching of the respective gate pulses Gate [1] to Gate [6] to the high level in the second half of the respective horizontal periods. In this manner, by having each of the gate pulses Gate [1] to Gate [6] repeat, over plural horizontal periods, the operation of switching to the high level in the second half of the horizontal period, the time required to detect the threshold voltage can be sufficiently secured.

On the other hand, by having each of the gate pulses Gate [1] to Gate [6] switch to the low level in the first half of each horizontal period, there is a state of non-conduction between the signal line 111 and the gate terminal of the drive transistor T3 such that the signal voltage Vdata is not supplied.

As described above, in the display device according to the present modification, the time required for detecting the threshold voltage Vth (TFT) is secured by setting the second half of each horizontal period as a threshold voltage Vth (TFT) detection period and repeating this over plural horizontal periods. Therefore, the voltage held in the capacitor element CS is stabilized and, as a result, high precision threshold voltage compensation is possible.

It should be noted that although the Vth detection period is set to four horizontal periods in FIG. 5, the horizontal periods required for the Vth detection period need not be limited to four horizontal periods as long as sufficient time for detecting the threshold voltage Vth (TFT) of the drive transistor T3 is secured.

Embodiment 2

The display device in Embodiment 2 is approximately the same as the display device 100 in Embodiment 1, but is different in that a reset transistor is inserted between the source terminal of a drive transistor and a gate line which is provided in the next row. Accordingly, even when the gate line is placed in the active state and the reset line is placed in the active state, the voltage of the source terminal of the drive transistor can be set to the voltage of the gate line of the next row, and thus, by setting the voltage of the gate line of the next row to a voltage that is lower than the reference voltage by at least the threshold voltage of the drive transistor, the detection of the threshold voltage of the drive transistor can be performed reliably. Specifically, compared to when the reset transistor is connected to the gate line of the same row, the optical-quenching of the luminescence pixels and the setting of the voltage of the source terminal of the drive transistor can be performed at the same time, and thus more time can be allotted to the detection of the threshold voltage of the drive transistor in one frame period. Hereinafter, the display device according to Embodiment 2 shall be described focusing on the points of difference with the display device 100 according to Embodiment 1.

Hereinafter, the display device according to Embodiment 2 of the present invention shall be described with reference to the Drawings.

Figure 6:
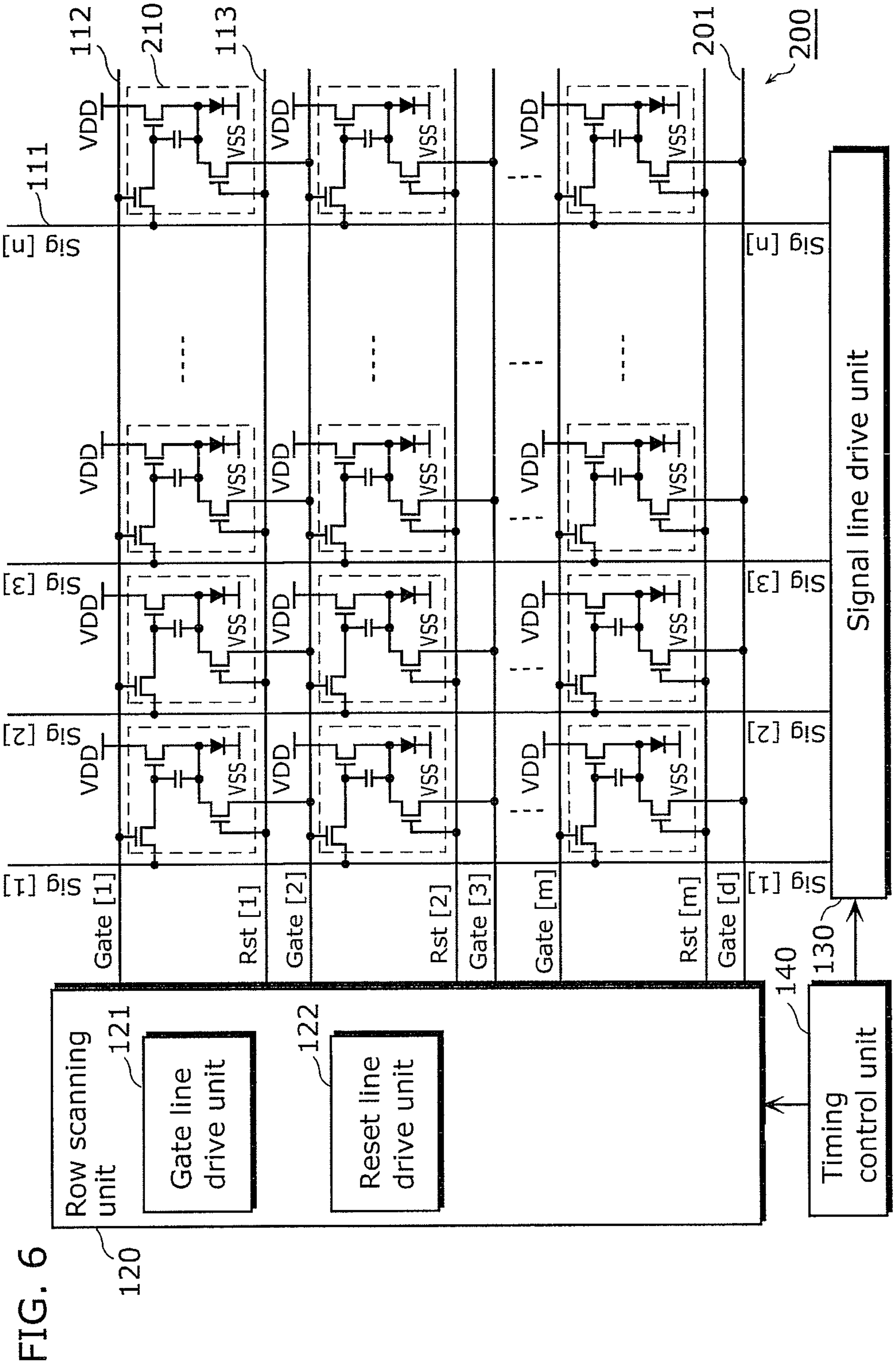
FIG. 6 is a block diagram showing a configuration of a display device according to Embodiment 2.

FIG. 6 is a block diagram showing a configuration of the display device according to Embodiment 2.

A display device 200 shown in the figure is different compared to the display device 100 shown in FIG. 1 in that each of luminescence pixels 210 are further connected to the gate line 112 of the next row. Furthermore, the display device 200 further includes a dummy gate line 201.

The dummy gate line 201 is connected to the luminescence pixels 210 in the last row, and is scanned by the gate line drive unit 121 in the same manner as the gate lines 112. The gate line drive unit 121 outputs, to the dummy gate line 201, a gate pulse Gate [d] which is pulse obtained by delaying the gate pulse Gate [m] by one horizontal period.

Figure 7:
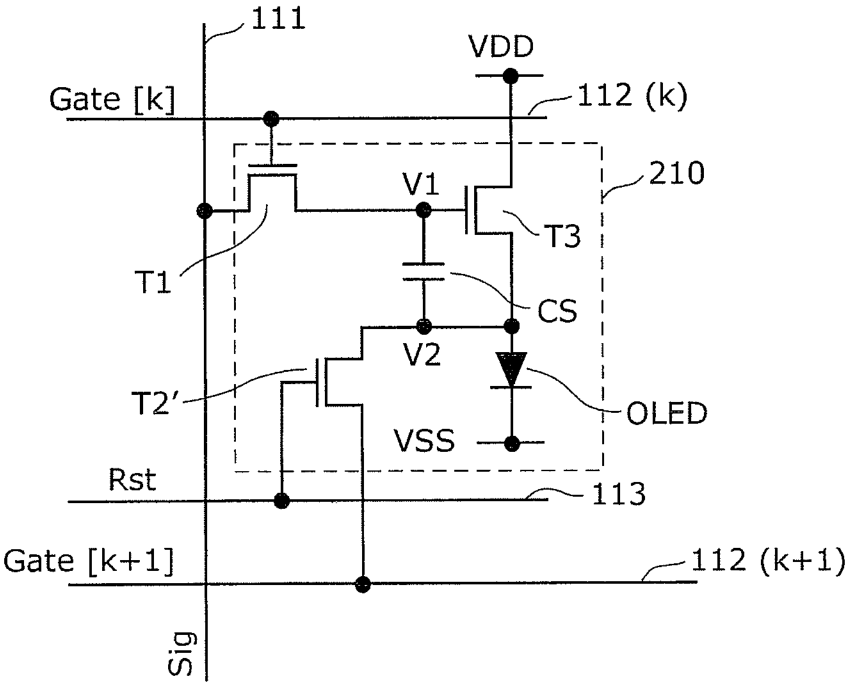
FIG. 7 is a circuit diagram showing a detailed configuration of a luminescence pixel.

FIG. 7 is a circuit diagram showing the detailed configuration of a luminescence pixel 210 shown in FIG. 6. It should be noted that the luminescence pixel 210 shown in the figure is a luminescence pixel 210 provided in the k-th row. Furthermore, the figure shows a signal line 111 corresponding to the luminescence pixel 210, a gate 112 (*k*) which is the gate line of the k-th row, a gate line 112 (*k*+1) which is the gate line of the k+1-th row, and a reset line 113.

Compared to the display pixel 110 shown in FIG. 2, the luminescence pixel 210 shown in the figure includes a reset transistor T2' in place of the reset transistor T2. Compared to the reset transistor T2 shown in Embodiment 1, the reset transistor T2' is inserted between the source terminal of the drive transistor T3 and the gate line 112 (*k*+1) of the next row.

By adopting such a configuration, the luminescence pixel 210 of the display device 200 according to the present embodiment allows the potential of the source terminal of the drive transistor T3, that is, V2, to be set using the voltage of the gate line 112 (*k*+1) of the next row.

Figure 8:
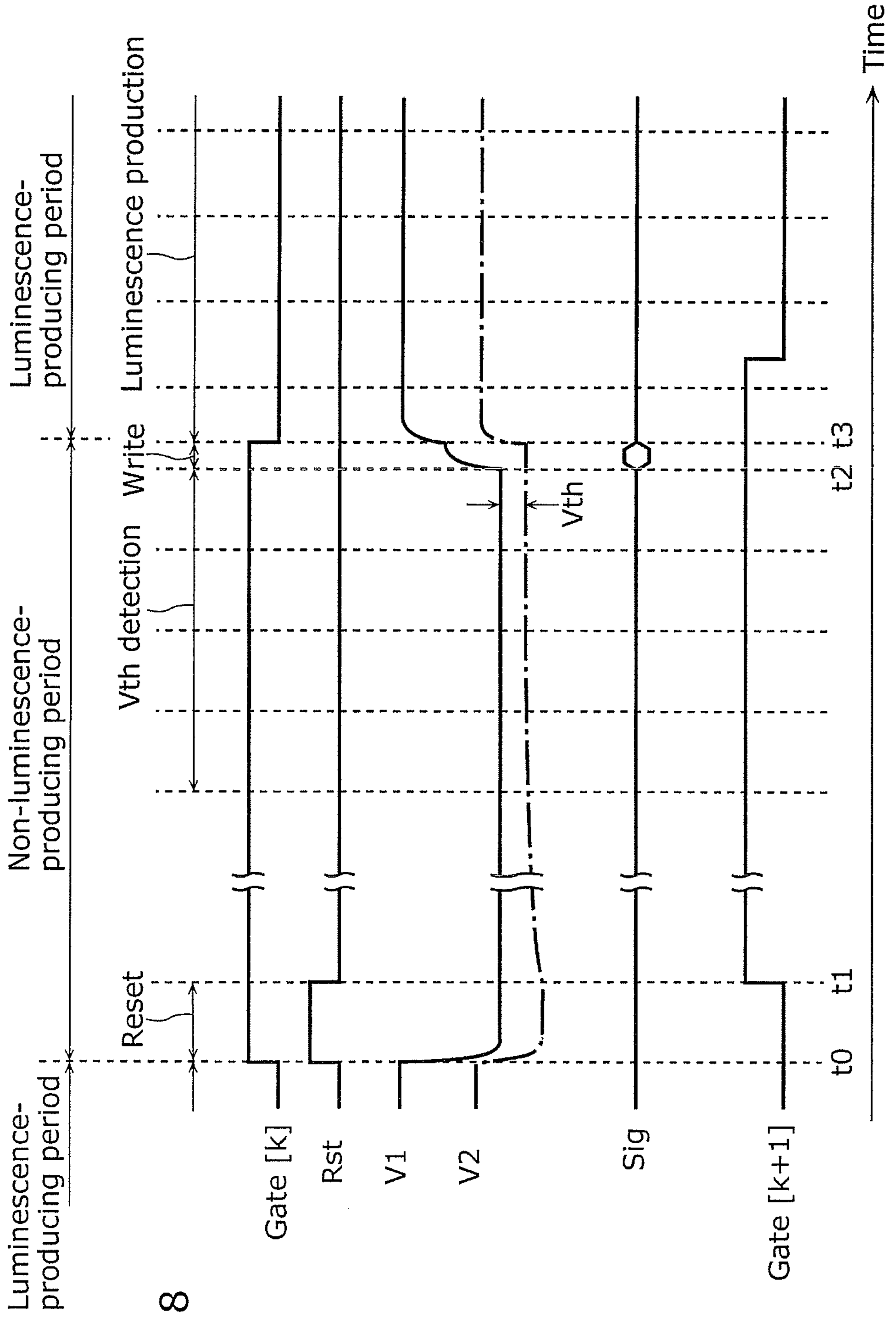
FIG. 8 is a timing chart showing the operation of the display device.

FIG. 8 is a timing chart showing the operation of the display device 200 according to Embodiment 2. Compared to the timing chart in FIG. 3, the vertical axis in the figure further shows a gate pulse Gate [k+1] that is supplied to the gate line 112 (*k*+1) of the next row. It should be noted that the low level voltage of the gate pulse Gate [k+1] is a voltage indicating a lower value than Vreset−Vth (TFT).

First, in a time t0, the gate pulse Gate [k] rises from the low level to the high level. Furthermore, the reset pulse Rst also rises from the low level to the high level. With this, the row selection transistor T1 turns ON and, at the same time, the reset transistor T2' also turns ON.

At this time, the reset transistor T2' switches to conduction between the gate line 112 (*k*+1) of the next row and the source terminal of the drive transistor T3, and thus V2 becomes the voltage of the gate pulse Gate [k+1] supplied to the gate line 112 (*k*+1) of the next row. In the time t0, the gate pulse Gate [k+1] of the next row is at the low level, and thus V2 becomes VGate (L).

Furthermore, by turning ON the row selection transistor T1, V1 becomes the voltage of the signal line 111. In a time t1, the voltage of the signal line is the reference voltage Vreset, and thus V1 transitions to Vreset.

In this manner, in the display device 200 in the present embodiment, even when the gate pulse Gate [k] of the same row as the luminescence pixel is switched to the high level and the reset pulse Rst is switched to the high level, the voltage of the source terminal of the drive transistor T3 can be set to the voltage of the gate line 112 (*k*+1) of the next row.

Here, since the gate pulse Gate [k+1] of the next row is at the low level and such low level voltage is lower voltage than Vreset−Vth (TFT), the detection of the threshold voltage Vth (TFT) of the drive transistor T3 can be performed reliably.

Therefore, although the reset [1] period and the reset [2] period are required prior to the Vth detection period in the display device 100 according to Embodiment 1, in the display device 200 according to the present embodiment, the preparatory operations for the threshold voltage detection can be performed in half the time compared to the display device 100.

Specifically, in the reset period shown in times t0 to t1 in FIG. 8, a voltage having a predetermined potential difference needs to be set in the capacitor element CS by setting the reference voltage Vreset from the signal line 111 to one end of the capacitor element CS and setting a fixed voltage to the other end of the capacitor element CS. In the display device 100 in Embodiment 1, in order to set a voltage having a predetermined potential difference to the capacitor element CS, the reset period is segmented into the times t0 to t1 in FIG. 3 which are the reset [1] period and the times t1 to t2 in FIG. 3 which are the reset [2] period, and these are divided into a period for setting the reference voltage Vreset to one end of the capacitor element CS and a period for setting a fixed voltage to the other end of the capacitor element CS. In contrast, in the present embodiment, the period for setting the reference voltage Vreset to one end of the capacitor element CS and the period for setting a fixed voltage to the other end of the capacitor element CS can be made simultaneous.

Here, in the times t0 to t1 in FIG. 8, when supplying the reference voltage Vreset to one end of the capacitor element CS, the row selection transistor T1 needs to be turned ON, and the gate pulse Gate [k] needs to be switched to the high level voltage VGate (H). At this time, the gate pulse Gate [k+1] corresponding to the next row is the low level voltage VGate (L). With that, by turning ON the reset transistor T2', the VGate [L], which is the voltage of the gate pulse Gate [k+1], is set to the other end of the capacitor element CS.

In other words, in Embodiment 1, in the preparatory operation for threshold voltage detection, the gate line 112, which corresponds to the row including the luminescence pixel 110 performing the operation, is also used as a power source line for supplying the fixed potential VGate (L). In contrast, in the present embodiment, the gate line 112 which corresponds to the row that is next to the row including the luminescence pixel 210 for which the preparatory operation for threshold voltage detection is being performed, is also used as the power source line for supplying the fixed potential VGate (L). Accordingly, in the display device 200 in the present embodiment, the fixed potential VGate (L) can be set to the other end of the capacitor element CS in half the time compared to the display 100 in Embodiment 1. In other words, the preparatory operation for threshold voltage detection can be performed in half the time compared to the display device 100.

Next, in the time t1 which is the end time of the reset period, the reset transistor T2' is turned OFF by the switching of the reset pulse Rst to the low level, and thus there is a state of non-conduction between the gate line 112 (*k*+1) and the source terminal of the drive transistor T3. Therefore, the potential difference between V1 and V2 at this time is held in the capacitor element CS.

The subsequent operations are the same as those following the time t3 in the timing chart of the display device 100 according to Embodiment 1 shown in FIG. 3. The gate pulse Gate [k+1] of the next row rises from the low level to the low level at a time t4. In other words, the reset period for the next row starts from the time 4.

It should be noted that it is sufficient that the gate pulse Gate [k+1] of the next row be at the low level in the period where the reset pulse Rst is at the high level, that is, at least during the reset period, and that it is not limited to the drive timing in FIG. 8.

Furthermore, in the same manner as in the modification of Embodiment 1, in the display device 200 according to the present embodiment, the detection of the threshold voltage may be performed over plural horizontal periods.

(Modification of Embodiment 2)

Figure 9:
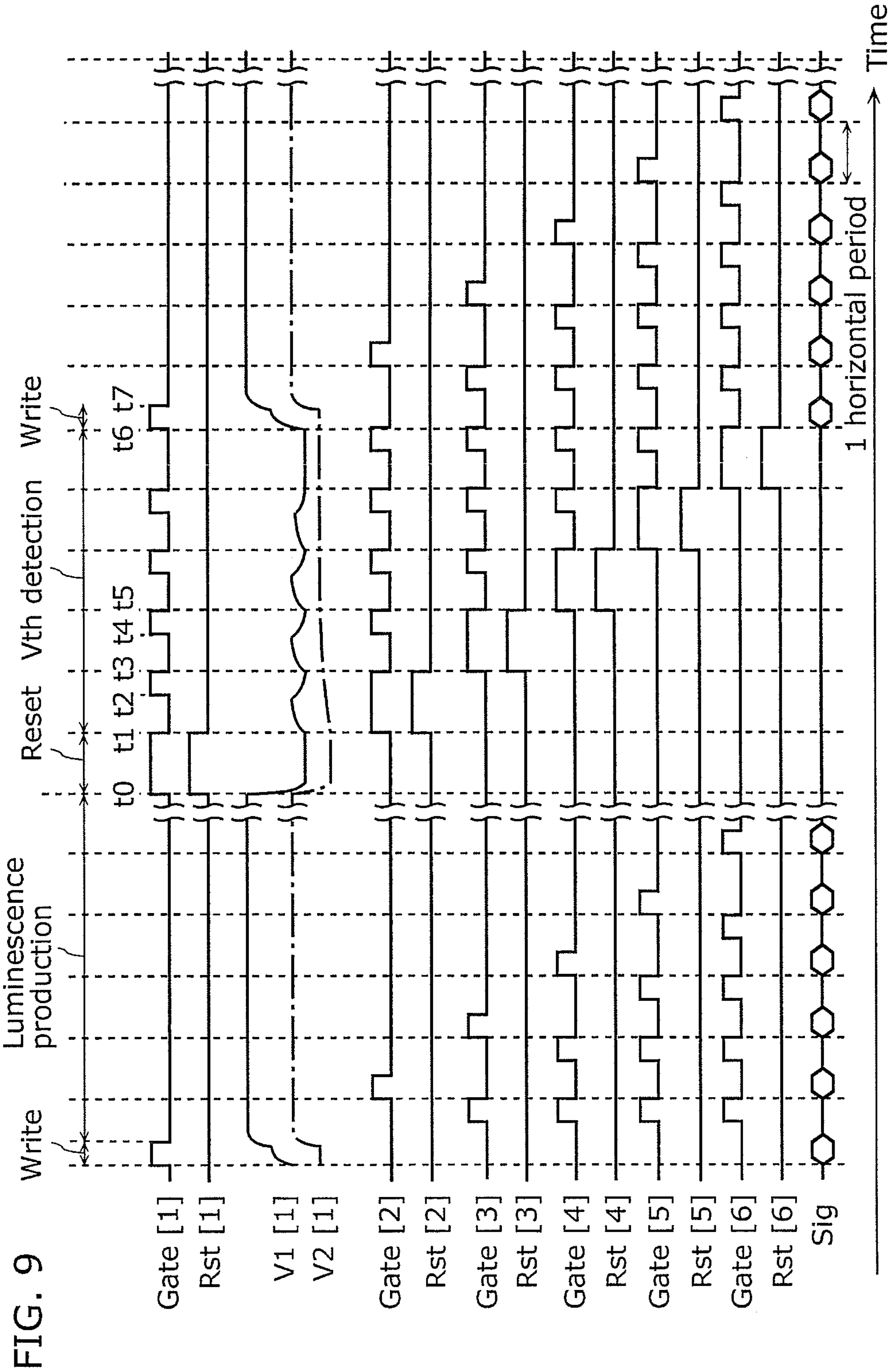
FIG. 9 is a timing chart showing the operation of the display device when detecting threshold voltage across plural horizontal periods.

FIG. 9 is a timing chart showing the operation of the display device 200 when detecting the threshold voltage over plural horizontal periods.

Compared to the timing chart shown in FIG. 5, in the timing chart shown in the figure, the period required for resetting is one horizontal period. In this manner, by performing the preparatory operation for threshold voltage detection in half the time, the Vth detection period can be made into a longer period compared to that in Embodiment 1, and thus high precision threshold voltage compensation can be realized. It should be noted that although the Vth detection period is set to five horizontal periods in FIG. 9, the horizontal periods required for the Vth detection period need not be limited to five horizontal periods as long as sufficient time for detecting the threshold voltage Vth (TFT) of the drive transistor T3 is secured.

Embodiment 3

The display device in Embodiment 3 is approximately the same as the display device 100 in Embodiment 1 but is different in that one of the source terminal and the drain terminal of the reset transistor and the other end of the capacitor element are connected to one of the source terminal and the drain terminal of the drive transistor via a predetermined element.

Specifically, compared to each of the luminescence pixels included in the display device 100 in Embodiment 1, each of the luminescence pixels included in the display device in the present embodiment further includes a second switching transistor including a gate terminal, a source terminal, and a drain terminal. One of the source terminal and the drain terminal of the second switching transistor is connected to one of the source terminal and the drain terminal of the reset transistor and to the other end of the capacitor element, and the other of the source terminal and the drain terminal of the second switching transistor is connected to one of the source terminal and the drain terminal of the drive transistor.

Hereinafter, the display device according to Embodiment 3 shall be described with reference to the Drawings.

Figure 10:
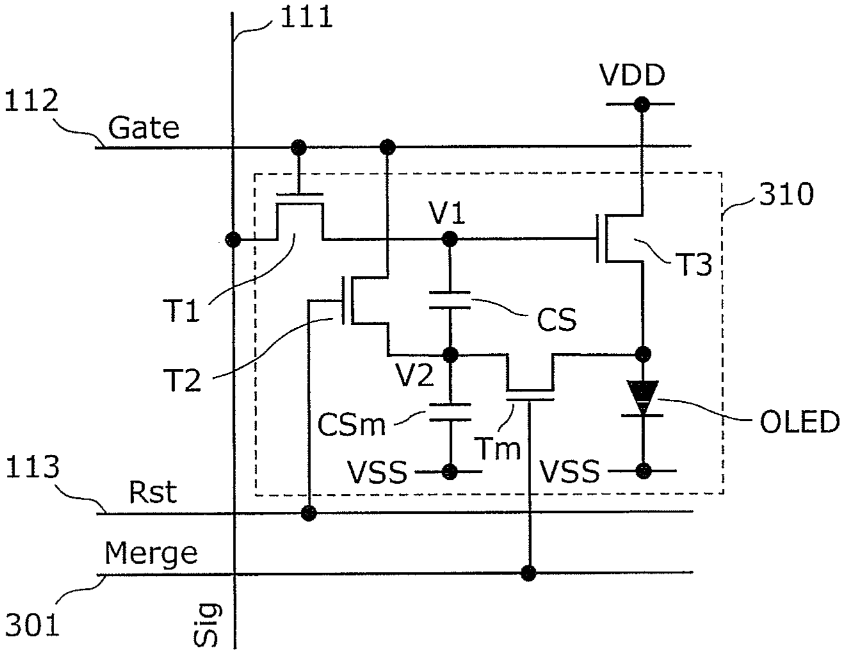
FIG. 10 is a circuit diagram showing a detailed configuration of a luminescence pixel included in a display device according to a Embodiment 3.

FIG. 10 is a circuit diagram showing a detailed configuration of a luminescence pixel included in the display device according to Embodiment 3. It should be noted that the signal line 111, gate line 112, and reset line 113 which correspond to a luminescence pixel 310 are also shown in the figure. Furthermore, although the configuration of one luminescence pixel among the luminescence pixels included in the display device according to the present embodiment is described in FIG. 10, the other luminescence pixels also have the same configuration.

First, the configuration of the display device according to the present embodiment shall be described.

The display device according to the present embodiment has approximately the same configuration as the display device 100 shown in FIG. 1, but is different compared to the display device 100 in having luminescence pixels 310 in place of the luminescence pixels 110, and in further having a merge line 301 provided corresponding to each row of the luminescence pixels 310.

The merge line 301 is provided corresponding to each row of the luminescence pixels 310, and a merge pulse Merge is outputted from the row scanning unit 120. Stated differently, compared to the row scanning unit 120 in the display device 100 in Embodiment 1, the scanning unit in the display device in the present embodiment sequentially scans the luminescence pixels 310 on a row basis by outputting the merge pulse Merge to the respective merge lines 301.

Next, the configuration of the luminescence pixel shown in FIG. 10 shall be described.

Compared to the luminescence pixel 110 included in the display device 100 according to Embodiment 1, the luminescence pixel 310 is different in that one of the source terminal and the drain terminal of the reset transistor T2 and the other end of the capacitor element CS are connected to the source terminal of the drive transistor T3 via a merge transistor Tm. Specifically, compared to the luminescence pixel 110, the luminescence pixel 310 further includes the merge transistor Tm and a merge capacitor CSm.

The merge transistor Tm, which corresponds to the second switching transistor in the present invention, includes a gate terminal, a source terminal, and a drain terminal and is, for example, a n-type TFT having one of the source terminal and the drain terminal connected to one of the source terminal and the drain terminal of the reset transistor T2 and to the other end of the capacitor element CS, and the other of the source terminal and the drain terminal connected to the source terminal of the drive transistor T3. The gate terminal of the merge transistor Tm is connected to the merge line 301. Specifically, the merge transistor Tm turns ON and OFF according to the merge pulse Merge supplied to the merge line 301.

The merge capacitor CSm is inserted between (i) the connection point of the merge transistor Tm, the capacitor element CS, and the reset transistor T2 and (ii) the power source line of the voltage VSS.

By adopting such a configuration, the display device according to the present invention which includes the luminescence pixels 310 can suppress the fluctuation of pixel current caused by variation in the parasitic capacitance of luminescence element OLED. The pixel current is the current supplied by the drive transistor T3 to the luminescence element OLED. For example, when the signal line drive unit 130 supplies the same signal voltage to the luminescence pixels 310, it becomes possible to suppress the variation of the potential of the connection point between the luminescence element OLED and the drive transistor T3 of the respective luminescence pixels 310. Therefore, it is possible to reduce the effect of the parasitic capacitance of the luminescence element OLED, and cause the luminescence element OLED to produce luminescence at the precise luminance corresponding to the signal voltage.

Figure 11:
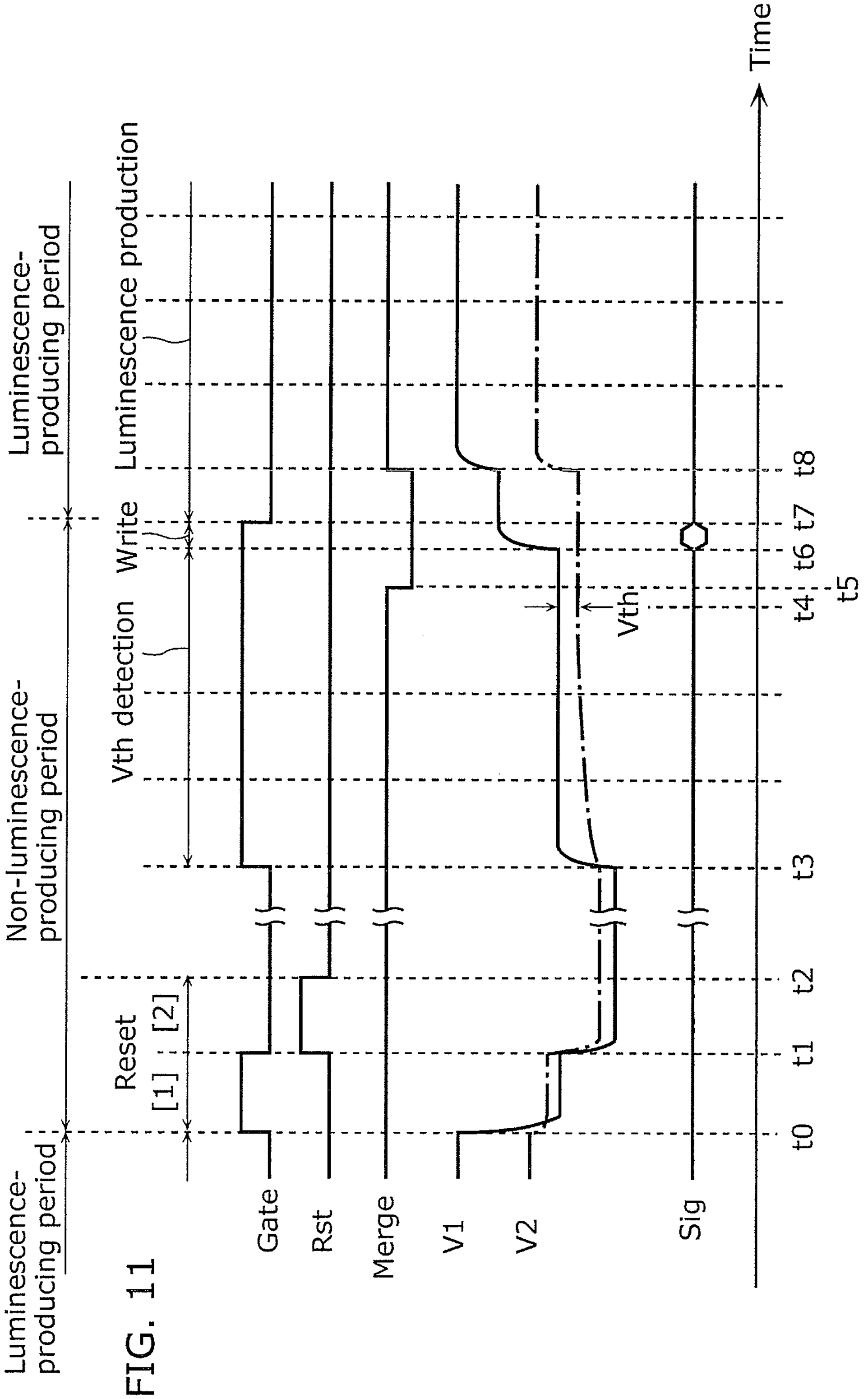
FIG. 11 is a timing chart showing the operation of the display device.
Figure 12:
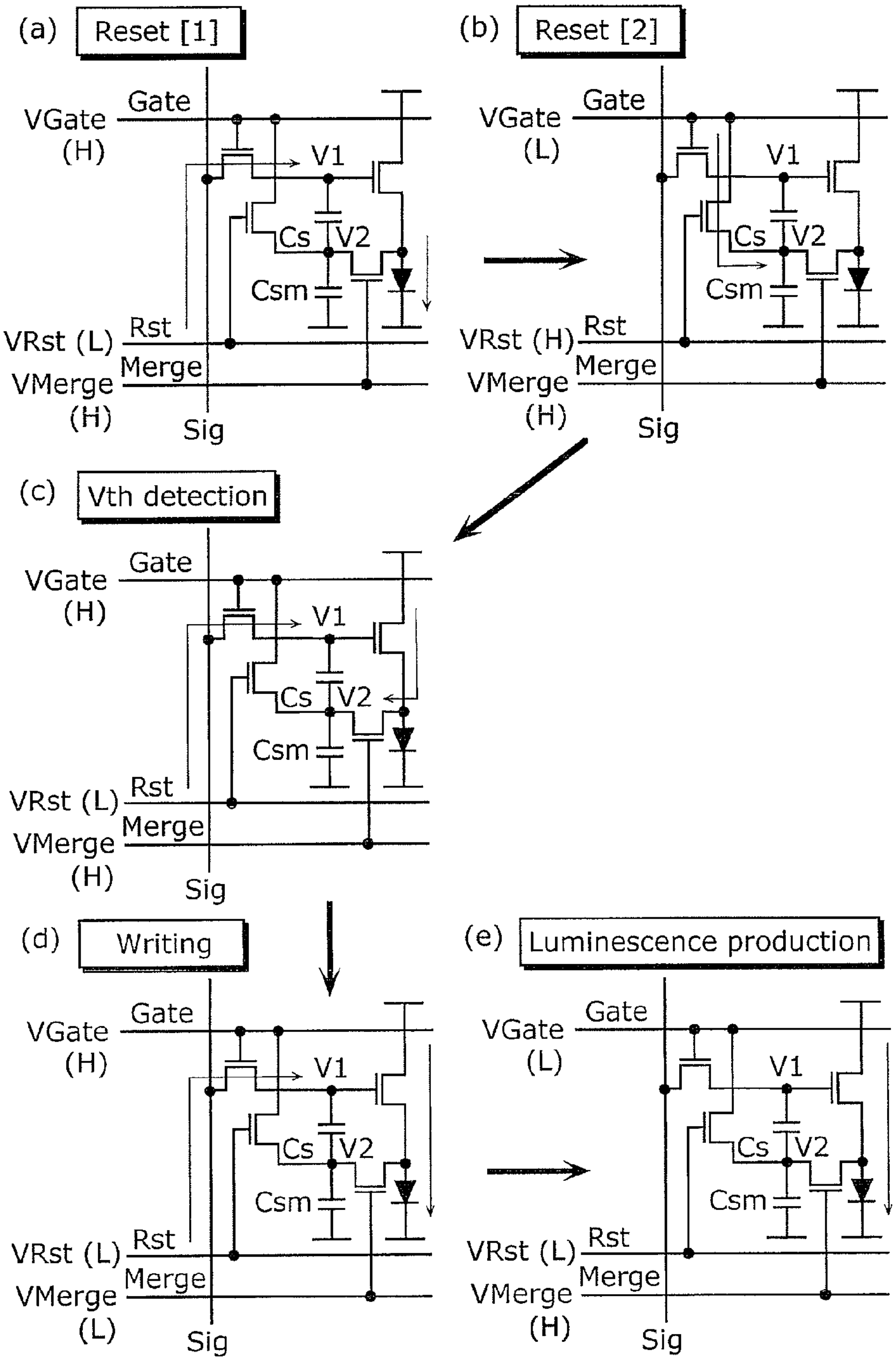
FIG. 12 is a diagram schematically showing the flow of current in a luminescence pixel.

Next, the method of driving the display device according to the present embodiment shall be described using FIG. 11 and FIG. 12.

FIG. 11 is a timing chart showing the operation of the display device according to Embodiment 3. Compared to the timing chart in FIG. 3, the vertical axis in the figure further shows the merge pulse Merge supplied to the merge line 301. It should be noted that although V2 in FIG. 3 is the potential of the source terminal of the drive transistor T3, V2 in FIG. 11 is the potential of the connection point between one of the source terminal and drain terminal of the reset transistor T2 and the other end of the capacitor element CS.

Among the waveforms shown in FIG. 11, the waveforms of the gate pulse Gate, the reset pulse Rst, and the signal line voltage Sig are the same as the waveforms of the gate pulse Gate, the reset pulse Rst, and the signal line voltage Sig, respectively, in the display device 100 according to Embodiment 1 shown in FIG. 3. Therefore, description shall be focused on the waveforms of the merge pulse Merge, V1, and V2.

First, in the period up to a time t5, the merge transistor Tm is turned ON by switching the merge pulse Merge to the high level. By turning ON the merge transistor Tm, there is conduction between the source terminal of the drive transistor T3 and the other end of the capacitor element CS. Specifically, in the period up to the time t5, the luminescence pixel 310 is equivalent to the luminescence pixel 110.

FIG. 12 is a diagram schematically showing the flow of current in the luminescence pixel 310 in the display device according to Embodiment 3. Here, the high level voltage of the merge pulse Merge is denoted as VMerge (H), and the low level voltage of the merge pulse Merge is denoted as VMerge (L).

As described above, the operation of the luminescence pixel 310 up to the time t5 is the same as the operation of the luminescence pixel 110 up to the time t5 shown in FIG. 3, and thus the flow of current in (a) to (c) in FIG. 12 is the same as the flow of current shown in (a) to (c) in FIG. 4.

Next, in the time t5, the merge pulse Merge falls from the high level to the low level. With this, the merge transistor Tm is turned OFF. The timing at which the merge pulse Merge falls from the high level to the low level need not be the timing shown in FIG. 11, as long as it is after the potential difference between V1 and V2 becomes Vth (TFT) and the current flowing to the drive transistor T3 stops.

Subsequently, in the writing period between times t6 to t7 (corresponding to the times t5 to t6 in FIG. 3), the merge pulse Merge is maintained at the low level, and signal voltage is applied to the signal line 111.

When the signal voltage is applied to the luminescence pixel 310 in this manner, V2 which is the potential of the other end of the capacitor element CS is determined by the signal voltage applied to the one end of the capacitor element CS, the voltage VSS of the power source line connected to the merge capacitor CSm, the capacitance Cs of the capacitor element CS, and the capacitance CSm of the merge capacitor CSm. In other words, V2 is defined by the capacitance distribution between the capacitance Cs of the capacitor element CS and the capacitance CSm of the merge capacitor CSm.

In contrast, when signal voltage is applied to the luminescence pixel 110 of the display device 100 according to Embodiment 1, the potential of V2 is determined by the signal voltage applied to V1, the voltage VSS of the power source line connected to the cathode of the luminescence element OLED, the capacitance Cs of the capacitor element CS, and the parasitic capacitance of the luminescence element OLED. In other words, the potential of V2 is defined by the capacitance Cs of the capacitor element CS and the parasitic capacitance of the luminescence element OLED. However, the parasitic capacitance between the anode and the cathode of the luminescence element OLED varies with each luminescence element OLED, and thus, even when the same signal voltage is supplied to the luminance pixels 110, the potential of the connection point between the luminescence element OLED and the drive transistor T3 is not the same, that is, there is variation among the luminance pixels 110. Therefore, due to the variation in the potential of the connection point between the between the luminescence element OLED and the drive transistor T3, the current supplied to the respective luminescence elements OLED also varies.

In the luminescence pixel 310 of the display device according to the present embodiment, the other end of the capacitor element CS and the source terminal of the drive transistor T3 are connected via the merge transistor Tm, and signal voltage is written into the luminescence pixel 310 during the period in which the merge transistor Tm is OFF, thereby allowing the effect that the parasitic capacitance of the luminescence element OLED has on the potential of V2 to be reduced.

Furthermore, since the merge transistor Tm is OFF during the period in which the signal voltage is written into the luminescence pixel 310, it is possible to suppress the self-discharge current of the capacitor element CS. Therefore, compared to the luminescence pixel in the display device 100 in Embodiment 1, the threshold voltage of the drive transistor T3 can be more precisely detected and compensated.

Next, in a time t7, the gate pulse switches to the low level and the row selection transistor T1 is turned OFF, thereby a current corresponding to the voltage supplied to the gate terminal of the drive transistor T3 begins to flow to the luminescence element OLED. Then, in a time t8, the merge pulse Merge is raised from the low level to the high level and the merge transistor Tm is turned ON, thereby connecting the source terminal of the drive transistor T3 and the capacitor element Cs. Accordingly, a current corresponding to the voltage Vgs between the gate and source terminals of the drive transistor T3 flows to the luminescence pixel OLED. Stated differently, in the writing period of the times t6 to t7, a current corresponding to the potential difference between (i) the potential V2 for which the effect of the parasitic capacitance of the luminescence element OLED has been reduced and (ii) the potential V1 flows in the luminescence element OLED. As a result, the effect of the parasitic capacitance of the luminescence element OLED is reduced, and a current which accurately corresponds to the signal voltage flows to the luminescence element OLED. Therefore, it is possible to cause the luminescence element to produce luminescence precisely according to the signal voltage.

In this manner, the merge transistor Tm is kept ON in the times t3 to t4 which is the period for detecting the threshold voltage of the drive transistor T3, then switched from ON to OFF at the time t5 after the threshold voltage detection, is kept OFF in the times t6 to t7 which is the writing period, and is switched from OFF to ON at the time t8 after the writing period (from the time t7 onward).

As described above, compared to each of the luminescence pixels 110 included in the display device 100 in Embodiment 1, each of the luminescence pixels 310 included in the display device in the present embodiment further includes the merge transistor Tm which includes a gate terminal, a source terminal, and a drain terminal, and has one of the source terminal and the drain terminal connected to one of the source terminal and the drain terminal of the reset transistor T2 and to the other end of the capacitor element, and the other of the source terminal and the drain terminal connected to the source terminal of the drive transistor T3.

Accordingly, it is possible to suppress the fluctuation of pixel current, which is the current supplied by the drive transistor T3 to the luminescence element OLED, caused by variation in the parasitic capacitance of luminescence element OLED. Specifically, when the signal line drive unit 130 supplies the same signal voltage to the luminescence pixels 310, it is possible to suppress the variation in the potential difference between the gate terminal and the source terminal of the drive transistor T3 among the respective luminescence pixels 310.

Therefore, it is possible to inhibit the effect of the parasitic capacitance of the luminescence element OLED, and cause the luminescence element OLED to produce luminescence precisely according to the signal voltage.

It should be noted that although the merge capacitor CSm is inserted between (i) the connection point of the merge transistor Tm, the capacitor element CS, and the reset transistor T2 and (ii) the power source line of the voltage VSS, the power line to which it is connected need not be that of VSS as long as there is a fixed potential. For example, the merge capacitor CSm may be inserted between (i) the connection point of the merge transistor Tm, the capacitor element CS, and the reset transistor T2 and (ii) the power source line of the voltage VDD.

Furthermore, the reset transistor T2' shown in the luminescence pixel 210 of the display device in Embodiment 2 may be included in place of the reset transistor T2 of the luminescence pixel 310 of the display device in Embodiment 3. In other words, it is acceptable to include the reset transistor T2' which is inserted between (i) the gate line 112 corresponding to the row next to that of the current luminescence pixel and (ii) the connection point of the capacitor element CS, the merge capacitor CSm, and the merge transistor Tm.

Furthermore, although the threshold voltage is detected in one horizontal period in the display device in the present embodiment, the threshold voltage may be detected over plural horizontal periods in same manner as in the modification of Embodiment 2.

Although described based on the embodiments and modification, the present invention is not limited to such embodiments and modifications. As long as they do not depart from the essence of the present invention, various modifications to the present embodiments and modifications as well as configurations obtained by combining constituent elements of different embodiments and modifications, which may be conceived by those skilled in the art are intended to be included within the scope of this invention.

For example, although each of the row selection transistor and the reset transistor in Embodiment 2 are n-type transistors which turn ON when the pulse applied to the gate terminal is at high level, they may be configured of p-type transistors and the polarities of the gate line and the reset line may be reversed.

Furthermore, although the merge capacitor CSm is inserted between (i) the connection point of the merge transistor Tm, the capacitor element CS, and the reset transistor T2 and (ii) the power source line of the voltage VSS in Embodiment 3, the merge capacitor CSm does not necessarily have to be connected to a power source line. For example, a reset line during a low level output period may be used like a power source line, and the merge capacitor CSm may be connected to the reset line.

Figure 13:
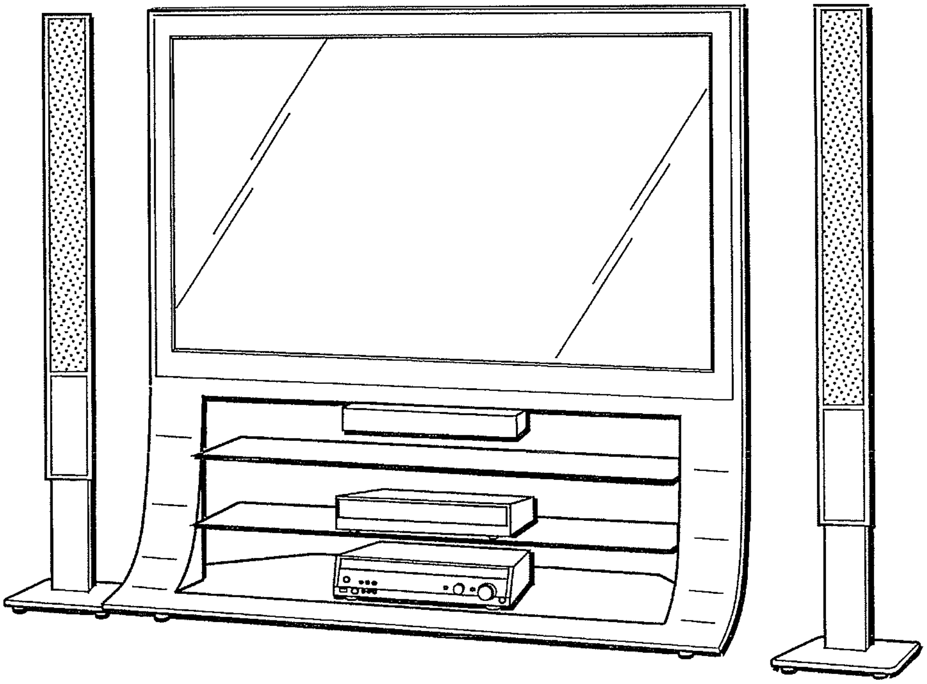
FIG. 13 is an outline view of a thin, flat TV equipped with the display device according to the present invention.

Furthermore, for example, the display device according to the present invention is built into a thin, flat TV such as that shown in FIG. 13. A thin, flat TV capable of high-precision image display without luminance unevenness is realized by having the display device according to the present invention built into the TV.

Furthermore, each of the display devices according to the respective embodiments described above are typically implemented as a single LSI which is an integrated circuit. It should be noted that the respective processing units included in the display devices according to the respective embodiments may be implemented as separate individual chips, or as a single chip to include a part or all thereof.

Although an LSI is mentioned here, there are instances where the designations IC, system LSI, super LSI, ultra LSI are used due to differences in the degree of integration.

Furthermore, circuit integration is not limited to the LSI, and part of the processing units included in the display device can be integrated on the same substrate as the luminescence pixels. Furthermore, they may be implemented as a dedicated circuit or a general-purpose processor. A Field Programmable Gate Array (FPGA) which allows programming after LSI manufacturing or a reconfigurable processor which allows reconfiguration of the connections and settings of circuit cells inside the LSI may be used.

Furthermore, part of the functions of the drive units included in the display devices in the respective embodiments may be implemented through the execution of a program by a processor such as a CPU. Furthermore, the present invention may also be implemented as a method of driving a display device which includes the characteristic steps implemented through the drive units described above.

In addition, the present invention may be the aforementioned program, or a recording medium on which the program is recorded. Furthermore, it goes without saying that the aforementioned program can be distributed via a transmission medium such as the Internet, and so on.

Furthermore, although the foregoing descriptions exemplify the case where the display devices are active matrix-type organic EL display devices, the present invention may be applied to organic EL display devices other than the active matrix-type, display devices other than an organic EL display device using a current-driven luminescence element, or display devices using a voltage-driven luminescence element such as a liquid crystal display device.

Furthermore, although the second half of each horizontal period is set as a threshold voltage detection period and the first half is set as a signal voltage writing period in the modification of Embodiment 1 and the modification of Embodiment 2, the duty ratio of such detection period and writing period is not limited to 50 percent. For example, the writing period may be 10 percent of one horizontal period and the detection period may be 90 percent of one horizontal period.

Furthermore, although the reset transistor T2' included in the luminescence pixels 110 in the m-th row is connected to the dummy gate line 201 in above-described Embodiment 2, it may be connected to any one of the respective gate lines 112 from the first row to the m-th row.

Furthermore, a capacitor element may be provided between the source terminal of the drive transistor T3 and the power source line.

Although only exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The display device according to the present invention is particularly useful for application to a large-screen active-matrix organic EL display panel that is combined with a TFT.

What is claimed is:

1. A display device, comprising:

luminescence pixels arranged in rows and columns;

gate lines and reset lines, each of the gate lines and each of the reset lines corresponding to one of the rows of the luminescence pixels; and signal lines, each corresponding to one of the columns of the luminescence pixels, wherein each of the luminescence pixels includes:

a switching transistor including one of a switching source and a switching drain connected to a corresponding signal line of the signal lines, and a switching gate connected to a corresponding gate line of the gate lines;

a luminescence element for producing luminescence according to a flow of current;

a drive transistor including a drive gate connected to an other of the switching source and the switching drain, one of a drive source and a drive drain being connected to the luminescence element for supplying current to the luminescence element, an other of the drive source and the drive drain being connected to a power source during supply of current to the luminescence element;

a reset transistor including a reset gate connected to a corresponding reset line of the reset lines, one of a reset source and a reset drain connected to the one of the drive source and the drive drain, and an other of the reset source and the reset drain connected to the corresponding gate line; and a capacitor including a first terminal connected to the drive gate, and a second terminal connected to the one of the drive source and the drive drain, the display device further comprises:

a controller configured to:

supply an ON signal and an OFF signal to each of the switching transistor and the reset transistor to switch ON and OFF each of the switching transistor and the reset transistor;

supply the ON signal to the corresponding gate line to which the other of the reset source and the reset drain is connected to place the corresponding gate line in a first active state in which the switching transistor is switched ON, while supplying the OFF signal to the corresponding reset line to place the corresponding reset line in a first inactive state in which the reset transistor is switched OFF, to set a predetermined reference voltage to the first terminal of the capacitor via the corresponding signal line; and after the predetermined reference voltage is set to the first terminal of the capacitor, supply the OFF signal to the corresponding gate line to place the corresponding gate line in a second inactive state in which the switching transistor is switched OFF, while supplying the ON signal to the corresponding reset line to place the corresponding reset line in a second active state in which the reset transistor is switched ON, to set the second terminal of the capacitor to a low level voltage.

2. The display device according to claim 1, wherein the controller is further configured to selectively supply, to the signal lines, one of the predetermined reference voltage and a signal voltage that is greater than the predetermined reference voltage, and a voltage of the corresponding gate line in the second inactive state is less than the predetermined reference voltage by at least a threshold voltage of the drive transistor.

3. The display device according to claim 1, wherein the one of the reset source and the reset drain and the second terminal of the capacitor are connected to the one of the drive source and the drive drain via a predetermined element.

4. The display device according to claim 3, wherein each of the luminescence pixels further includes a second switching transistor including one of a second switching source and a second switching drain connected to the one of the reset source and the reset drain and the second terminal of the capacitor, and an other of the second switching source and the second switching drain connected to the one of the drive source and the drive drain.

5. The display device according to claim 1, wherein each of the drive transistor, the switching transistor, and the reset transistor comprise an n-type transistor element.

6. The display device according to claim 1, wherein the luminescence element is an organic electroluminescence element.

7. A method of driving a display device, the display device including:

luminescence pixels arranged in rows and columns;

gate lines and reset lines, each of the gate lines and each of the reset lines corresponding to one of the rows of the luminescence pixels; and signal lines, each corresponding to one of the columns of the luminescence pixels and being selectively supplied with one of a reference voltage and a signal voltage that is greater than the reference voltage, each of the luminescence pixels including:

a first switching transistor including one of a switching source and a switching drain connected to a corresponding signal line of the signal lines, and a switching gate connected to a corresponding gate line of the gate lines;

a luminescence element for producing luminescence according to a flow of current;

a drive transistor including a drive gate connected to an other of the switching source and the switching drain, one of a drive source and a drive drain being connected to the luminescence element for supplying current to the luminescence element, an other of the drive source and the drive drain being connected to a power source during supply of current to the luminescence element;

a reset transistor including a reset gate connected to a corresponding reset line of the reset lines, one of a reset source and a reset drain connected to the one of the drive source and the drive drain, and an other of the reset source and the reset drain connected to the corresponding gate line; and a capacitor including a first terminal connected to the drive gate, and a second terminal connected to the one of the drive source and the drive drain, the display device further includes a controller configured to supply an ON signal and an OFF signal to each of the first switching transistor and the reset transistor to switch ON and OFF each of the first switching transistor and the reset transistor, and the method comprises:

supplying the ON signal to the corresponding gate line to which the other of the reset source and the reset drain is connected to place the corresponding gate line in a first active state in which the first switching transistor is switched ON, while supplying the OFF signal to the corresponding reset line to place the corresponding reset line in a first inactive state in which the reset transistor is switched OFF, to set a predetermined reference voltage to the first terminal of the capacitor via the corresponding signal line; and after the predetermined reference voltage is set to the first terminal of the capacitor, supplying the OFF signal to the corresponding gate line to place the corresponding gate line in a second inactive state in which the first switching transistor is switched OFF, while supplying the ON signal to the corresponding reset line to place the corresponding reset line in a second active state in which the reset transistor is switched ON, to set the second terminal of the capacitor to a low level voltage.

8. The method according to claim 7, further comprising:

detecting a threshold voltage of the drive transistor by switching ON the first switching transistor, after setting the predetermined reference voltage to the first terminal of the capacitor and setting the second terminal of the capacitor to the low level voltage;

holding, in the capacitor, the threshold voltage;

supplying a signal voltage to the drive gate after the threshold voltage is held in the capacitor, the signal voltage for causing the luminescence element to produce the luminescence; and causing the luminescence element to produce the luminescence by switching OFF the first switching transistor so that a current corresponding to a potential difference between the drive gate and the drive source flows to the luminescence element.

9. The method according to claim 8, wherein the threshold voltage of the drive transistor is detected by repeatedly and successively switching ON and switching OFF the first switching transistor.

10. The method according to claim 9, wherein, when switching ON the first switching transistor when detecting the threshold voltage, the predetermined reference voltage is supplied to the corresponding signal line, and when switching OFF the first switching transistor when detecting the threshold voltage, one of the signal voltage and the predetermined reference voltage is supplied to the corresponding signal line.

11. The method according to claim 8, wherein each of the luminescence pixels further includes a second switching transistor including one of a second switching source and a second switching drain connected to the one of the reset source and the reset drain and the second terminal of the capacitor, and an other of the second switching source and the second switching drain connected to the one of the drive source and the drive drain, the threshold voltage of the drive transistor is detected by switching ON the first switching transistor when the second switching transistor is switched ON, the second switching transistor is switched OFF so that the threshold voltage is held in the capacitor, the signal voltage is supplied to the drive gate when the second switching transistor is switched OFF by supplying the signal voltage to the corresponding signal line when the first switching transistor is switched ON, and the luminescence element is caused to produce the luminescence by switching the second switching transistor from OFF to ON after switching the first switching transistor from ON to OFF so that the current corresponding to the potential difference between the drive gate and the drive source flows to the luminescence element.

12. The display device according to claim 1, wherein, after the controller sets the predetermined reference voltage to the first terminal of the capacitor, and when the controller sets the low level voltage to the second terminal of the capacitor by supplying the OFF signal to the corresponding gate line, while supplying the ON signal to the corresponding reset line, the capacitor is set with a voltage which is defined based on the predetermined reference voltage or the low level voltage.

13. The display device according to claim 1, wherein after the controller sets the predetermined reference voltage to the first terminal of the capacitor, and when the controller sets the low level voltage to the second terminal of the capacitor by supplying the OFF signal to the corresponding gate line, while supplying the ON signal to the corresponding reset line, the first terminal and the second terminal of the capacitor have different voltages.

14. The method according to claim 7, wherein, after the predetermined reference voltage is set to the first terminal of the capacitor, and when the low level voltage is set to the second terminal of the capacitor by supplying the OFF signal to the corresponding gate line, while supplying the ON signal to the corresponding reset line, the capacitor is set with a voltage which is defined based on the predetermined reference voltage or the low level voltage.

15. The method according to claim 7, wherein after the predetermined reference voltage is set to the first terminal of the capacitor, and when the low level voltage is set to the second terminal of the capacitor by supplying the OFF signal to the corresponding gate line, while supplying the ON signal to the corresponding reset line, the first terminal and the second terminal of the capacitor have different voltages.

* * * * *